(12) United States Patent
Yamaguchi et al.

(10) Patent No.: US 10,984,344 B2
(45) Date of Patent: Apr. 20, 2021

(54) DOCUMENT CLASSIFYING DEVICE

(71) Applicant: Kao Corporation, Tokyo (JP)

(72) Inventors: Masakazu Yamaguchi, Sumida-ku (JP); Toshiyuki Ando, Sumida-ku (JP); Shinsuke Nagahara, Sumida-ku (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 16/765,623

(22) PCT Filed: Nov. 22, 2017

(86) PCT No.: PCT/JP2017/041920
§ 371 (c)(1),
(2) Date: May 20, 2020

(87) PCT Pub. No.: WO2019/102533
PCT Pub. Date: May 31, 2019

(65) Prior Publication Data
US 2020/0279189 A1   Sep. 3, 2020

(51) Int. Cl.
*G06N 20/00* (2019.01)
*G06F 16/906* (2019.01)
(Continued)

(52) U.S. Cl.
CPC .......... *G06N 20/00* (2019.01); *G06F 16/906* (2019.01); *G06F 16/90344* (2019.01);
(Continued)

(58) Field of Classification Search
CPC ........ G06F 16/906; G06F 40/30; G06F 16/93; G06F 40/279; G06F 16/90344;
(Continued)

(56) References Cited

U.S. PATENT DOCUMENTS

2003/0110181 A1* 6/2003 Schuetze ............... G06F 16/904
2013/0013603 A1   1/2013 Parker et al.

FOREIGN PATENT DOCUMENTS

CN   101174407 A   5/2008
CN   102804125 A   11/2012
(Continued)

OTHER PUBLICATIONS

Office Action dated May 19, 2020 in corresponding Japanese Patent Application No. 2019-556006 (with English Translation), 12 pages.
(Continued)

*Primary Examiner* — Etienne P Leroux
(74) *Attorney, Agent, or Firm* — Oblon, McClelland, Maier & Neustadt, L.L.P.

(57) ABSTRACT

A document classifying device (10) includes: a unit (22) configured to acquire information regarding a to-be-classified document set in which classification codes based on multi-viewpoint classification are assigned to each document in advance; a unit (23) configured to generate a multi-dimensional feature vector for each document in the to-be-classified document set, the multi-dimensional feature vector having, as elements, all or part of the classification codes assigned to the to-be-classified document set; classifying unit (24) configured to classify the to-be-classified document set using the feature vector of each document; and a generating unit (25) that generates document classification information indicating a result of the classification.

9 Claims, 18 Drawing Sheets

(51) Int. Cl.
 *G06F 16/93* (2019.01)
 *G06F 16/903* (2019.01)
 *G06F 40/279* (2020.01)
 *G06F 40/30* (2020.01)
 *G06Q 10/10* (2012.01)
 *G06Q 50/18* (2012.01)

(52) U.S. Cl.
 CPC ............ *G06F 16/93* (2019.01); *G06F 40/279* (2020.01); *G06F 40/30* (2020.01); *G06Q 10/10* (2013.01); *G06F 2216/11* (2013.01); *G06Q 50/184* (2013.01)

(58) Field of Classification Search
 CPC .... G06F 2216/11; G06N 20/00; G06Q 50/18; G06Q 10/10; G06Q 50/184
 See application file for complete search history.

(56) References Cited

FOREIGN PATENT DOCUMENTS

| | | |
|---|---|---|
| CN | 104011720 A | 8/2014 |
| JP | 2008-84151 A | 4/2008 |
| JP | 2008-90612 A | 4/2008 |
| JP | 2009-230323 A | 10/2009 |
| JP | 2010-20530 A | 1/2010 |
| JP | 2013-131170 A | 7/2013 |
| JP | 2013-225207 A | 10/2013 |
| JP | 2014-2563 A | 1/2014 |
| JP | 2015-207173 A | 11/2015 |
| WO | WO 2012/162405 A1 | 11/2012 |

OTHER PUBLICATIONS

International Search Report dated Feb. 20, 2018 in PCT/JP2017/041920 filed on Nov. 22, 2017, 2 pages.

Meguro, et al., "F Improvement of Patent Search System Using Term Concept Vectors," Proceedings of the 21st annual meeting of the Association for Natural Language Processing, pp. 768-771, Mar. 2015 (with English translation) (total 10 pages).

Verma, et al., "Patent Search using IPC Classification Vectors," Proceedings of the 4th workshop on Patent information retrieval, pp. 9-12, 2011, DOI: 10.1145/2064975.2064980 (total 5 pages).

* cited by examiner

F-TERM CODES USED FOR VECTOR ELEMENTS

① 4C038VA04
② 4C038VB03
③ 4C038VB22
④ 4C038VC05
⑤ 4C117XB01
⑥ 4C117XB13
⑦ 4C117XD05
⑧ 4C117XE36
．
．
．

|  | | ① | ② | ③ | ④ | ⑤ | ⑥ | ⑦ | ⑧ | ... |
|---|---|---|---|---|---|---|---|---|---|---|
| FEATURE VECTOR FOR DOCUMENT 1 | DOC1 | 1 | 1 | 1 | 1 | 0 | 0 | 0 | 0 | ... |
| FEATURE VECTOR FOR DOCUMENT 2 | DOC2 | 1 | 0 | 1 | 1 | 1 | 1 | 1 | 1 | ... |
| FEATURE VECTOR FOR DOCUMENT 3 | DOC3 | 1 | 0 | 0 | 1 | 0 | 1 | 0 | 0 | ... |
| ．<br>．<br>． | ．<br>．<br>． | | | | | | | | | |

FIG.11A

| APPLICANT (TOTAL NUMBER OF DOCUMENTS) | CL0 | CL1 | CL2 | CL3 | CL4 | CL5 | CL6 | CL7 |
|---|---|---|---|---|---|---|---|---|
| APPLICANT A (83) | 28 | 0 | 16 | 10 | 25 | 0 | 4 | 0 |
| APPLICANT B (24) | 1 | 0 | 0 | 4 | 16 | 0 | 3 | 0 |
| APPLICANT C (15) | 3 | 1 | 0 | 6 | 3 | 0 | 2 | 0 |
| APPLICANT D (109) | 1 | 29 | 0 | 35 | 10 | 2 | 32 | 0 |
| APPLICANT E (19) | 0 | 1 | 0 | 14 | 0 | 0 | 4 | 0 |

FIG.11B

|  | CL0 | CL1 | CL2 | CL3 | CL4 | CL5 | CL6 | CL7 |
|---|---|---|---|---|---|---|---|---|
| AVG. | 0.4072 | 0.2574 | 0.6612 | 0.2310 | 0.2627 | 0.3795 | 0.3833 | 0.2363 |
| MAX. | 0.5620 | 0.3679 | 0.7193 | 0.3723 | 0.3826 | 0.3920 | 0.5640 | 0.2660 |
| MIN. | 0.3039 | 0.1559 | 0.5841 | 0.1412 | 0.1026 | 0.3669 | 0.2094 | 0.2035 |

FIG.12

|  | AGGLOMERATIVE METHOD | | | | | | | |
|---|---|---|---|---|---|---|---|---|
| K-MEANS METHOD | | CL0 | CL1 | CL2 | CL3 | CL4 | CL5 | CL6 | CL7 |
| | CL0 | 0 | 0 | 0 | 39 | 0 | 0 | 1 | 0 |
| | CL1 | 1 | 2 | 0 | 5 | 23 | 0 | 0 | 0 |
| | CL2 | 3 | 0 | 0 | 0 | 0 | 13 | 0 | 0 |
| | CL3 | 3 | 65 | 1 | 5 | 0 | 0 | 7 | 0 |
| | CL4 | 5 | 4 | 0 | 3 | 0 | 0 | 49 | 0 |
| | CL5 | 0 | 0 | 2 | 0 | 0 | 0 | 0 | 0 |
| | CL6 | 21 | 3 | 28 | 0 | 0 | 0 | 3 | 0 |
| | CL7 | 0 | 0 | 0 | 0 | 0 | 0 | 3 | 0 |

FIG.13

| | USING F-TERM CODES CONTAINING 4C083 (355-DIMENSION) | | | | | | | |
|---|---|---|---|---|---|---|---|---|
| | CL0 | CL1 | CL2 | CL3 | CL4 | CL5 | CL6 | CL7 |
| USING ALL OF F-TERM CODES (1042-DIMENSION) CL0 | 0 | 30 | 10 | 0 | 0 | 0 | 0 | 0 |
| CL1 | 0 | 0 | 7 | 0 | 1 | 3 | 1 | 19 |
| CL2 | 0 | 16 | 0 | 0 | 0 | 0 | 0 | 0 |
| CL3 | 3 | 0 | 23 | 0 | 54 | 0 | 1 | 0 |
| CL4 | 30 | 0 | 2 | 22 | 6 | 0 | 1 | 0 |
| CL5 | 0 | 0 | 0 | 0 | 2 | 0 | 0 | 0 |
| CL6 | 6 | 1 | 14 | 1 | 30 | 0 | 3 | 0 |
| CL7 | 0 | 0 | 0 | 3 | 0 | 0 | 0 | 0 |

FIG.14

| | 1043-DIMENSION WITH RESULT OF SEARCHING FOR CHARACTER STRING BEING ADDED, K-MEANS METHOD | | | | | | | |
|---|---|---|---|---|---|---|---|---|
| 1042-DIMENSION, K-MEANS METHOD | | CL0 | CL1 | CL2 | CL3 | CL4 | CL5 | CL6 | CL7 |
| | CL0 | 5 | 0 | 0 | 0 | 0 | 0 | 1 | 34 |
| | CL1 | 0 | 0 | 0 | 21 | 0 | 0 | 9 | 1 |
| | CL2 | 0 | 0 | 0 | 0 | 16 | 0 | 0 | 0 |
| | CL3 | 0 | 0 | 18 | 0 | 0 | 0 | 56 | 7 |
| | CL4 | 0 | 2 | 42 | 0 | 0 | 0 | 16 | 1 |
| | CL5 | 0 | 0 | 0 | 0 | 0 | 2 | 0 | 0 |
| | CL6 | 0 | 23 | 6 | 0 | 0 | 25 | 0 | 1 |
| | CL7 | 0 | 0 | 0 | 0 | 0 | 0 | 3 | 0 |

FIG.15

| | | 1074-DIMENSION WITH HEAD IPC CODES AND F-TERM CODES, K-MEANS METHOD | | | | | | | |
|---|---|---|---|---|---|---|---|---|---|
| | | CL0 | CL1 | CL2 | CL3 | CL4 | CL5 | CL6 | CL7 |
| 1042-DIMENSION, K-MEANS METHOD | CL0 | 2 | 0 | 0 | 0 | 38 | 0 | 0 | 0 |
| | CL1 | 7 | 0 | 22 | 0 | 2 | 0 | 0 | 0 |
| | CL2 | 0 | 0 | 0 | 0 | 0 | 0 | 0 | 16 |
| | CL3 | 45 | 0 | 0 | 0 | 0 | 0 | 36 | 0 |
| | CL4 | 8 | 0 | 0 | 0 | 0 | 42 | 11 | 0 |
| | CL5 | 0 | 2 | 0 | 0 | 0 | 0 | 0 | 0 |
| | CL6 | 0 | 52 | 0 | 1 | 1 | 0 | 1 | 0 |
| | CL7 | 0 | 0 | 0 | 0 | 0 | 0 | 3 | 0 |

FIG.16

| | 126-DIMENSION, K-MEANS METHOD, FIVE CLUSTERING | | | | |
|---|---|---|---|---|---|
| | | CL0 | CL1 | CL2 | CL3 | CL4 |
| 345-DIMENSION, K-MEANS METHOD, SIX CLUSTERING | CL0 | 0 | 0 | 6 | 0 | 2 |
| | CL1 | 9 | 0 | 2 | 0 | 3 |
| | CL2 | 0 | 0 | 0 | 0 | 1 |
| | CL3 | 1 | 2 | 0 | 0 | 0 |
| | CL4 | 0 | 0 | 0 | 1 | 0 |
| | CL5 | 8 | 0 | 0 | 0 | 0 |

FIG.17A

| | LDA METHOD, FIVE TOPIC MODEL | | | | |
|---|---|---|---|---|---|
| | | TPC0 | TPC1 | TPC2 | TPC3 | TPC4 |
| 345-DIMENSION, K-MEANS METHOD, SIX CLUSTERING | CL0 | 1 | 4 | 0 | 3 | 0 |
| | CL1 | 0 | 4 | 5 | 4 | 1 |
| | CL2 | 0 | 1 | 0 | 0 | 0 |
| | CL3 | 0 | 2 | 1 | 0 | 0 |
| | CL4 | 0 | 0 | 0 | 0 | 1 |
| | CL5 | 1 | 3 | 2 | 1 | 1 |

FIG.17B

| | LDA METHOD, FIVE TOPIC MODEL | | | | |
|---|---|---|---|---|---|
| | | TPC0 | TPC1 | TPC2 | TPC3 | TPC4 |
| 126-DIMENSION, K-MEANS METHOD, FIVE CLUSTERING | CL0 | 1 | 6 | 7 | 2 | 2 |
| | CL1 | 0 | 2 | 0 | 0 | 0 |
| | CL2 | 0 | 4 | 0 | 4 | 0 |
| | CL3 | 0 | 0 | 0 | 0 | 1 |
| | CL4 | 1 | 2 | 1 | 2 | 0 |

FIG.18A

|  | GROUP A | GROUP B |
|---|---|---|
| CL0 | 4 | 15 |
| CL1 | 1 | 2 |
| CL2 | 15 | 3 |
| CL3 | 2 | 0 |
| CL4 | 0 | 1 |
| CL5 | 0 | 2 |

FIG.18B

|  | GROUP A | GROUP B |
|---|---|---|
| CL0 | 5 | 10 |
| CL1 | 1 | 1 |
| CL2 | 16 | 12 |

DOCUMENT CLASSIFYING DEVICE

TECHNICAL FIELD

The present invention relates to a technique for classifying documents.

BACKGROUND ART

Patent or utility model relating documents such as patent gazettes, registered utility model gazettes, laid-open disclosure public patent bulletin, and published Japanese translations of PCT international publication for patent applications (hereinafter collectively referred to as patent documents) include classification codes such as International Patent Classification (IPC) code, File Index (FI) code, and F-term code. A classification code called CS term is also assigned to various types of documents stored in the computer software database (CSDB) operated by the Japanese Patent Office or distinctive classification code is assigned in certain instances to in-house technical publications and relating documents managed in some companies.

There are various types of methods of searching documents using such classification codes assigned to the documents.

Patent Document 1 described below discloses a method of assisting researchers or developers to easily search for documents relating to industrial property rights such as patent documents. This method extracts a theme code and an F-term code from a result of searching using a publication number inputted by a user as a searching key, and presents them to make it easy to perform searching using the F-term code.

Patent Document 2 described below discloses a method that uses classification codes and performs statistical processing to make it possible to rapidly and simply analyze technical fields to which many patent documents belong. This method extracts plural classification codes assigned to individual patent documents; selects classification codes for numerical analysis from among a set of the extracted classification codes; calculates the coordinate of the classification codes for numerical analysis using numerical analysis; calculates a coordinate of each of the patent documents on the basis of the coordinate of the classification codes for numerical analysis; and on the basis of the coordinate of the patent documents, creates a predetermined map indicating the density thereof.

Non-Patent Document 1 described below discloses a method in which an F-term concept vector or a weighted F-term concept vector is prepared, the F-term concept vector being obtained by quantifying easiness of assigning F-term codes to each patent document, and a similarity degree between patent documents is calculated, thereby improving the accuracy of patent searching. In this method, an SVM classifier for each F-term code is utilized, the SVM classifier being learnt using patent documents as learning data and using, as a feature, morpheme uni-gram appearing in the patent documents, and an F-term concept vector is generated by using the output value from the SVM classifier.

RELATED ART DOCUMENT

Patent Document 1: Japanese Patent Application Laid-open No. 2014-2563
Patent Document 2: Japanese Patent Application Laid-open No. 2015-207173

NON-PATENT DOCUMENT

Non-Patent Document 1: Koji Meguro (and five others), "improvement of patent searching system using F-term concept vector," in proceedings of the 21st annual meeting of the Association for Natural Language Processing, pp. 768-771 (March 2015)

SUMMARY OF THE INVENTION

The present invention relates to a document classifying device including: a document-set acquiring unit that acquires information regarding a to-be-classified document set in which classification codes based on multi-viewpoint classification are assigned to each document in advance; a vector generating unit that generates a multi-dimensional feature vector for each document in the to-be-classified document set, the multi-dimensional feature vector having, as elements, all or part of the classification codes assigned to the to-be-classified document set; a classifying unit that classifies the to-be-classified document set using the feature vector of each document of the to-be-classified document set; and a generating unit that generates document classification information indicating a result of the classification.

BRIEF DESCRIPTION OF THE DRAWINGS

FIG. 11A is a table indicating the number of documents for each cluster in terms of each of five applicants,
and FIG. 11B is a table in which statistical information regarding a similarity degree between one specific document and other documents by an applicant A is indicated for each cluster;
FIG. 12 is a table indicating results of classifying the same to-be-classified document set through k-means clustering and agglomerative clustering;
FIG. 13 is a table indicating results of classifying the same to-be-classified document set through the same cluster analysis using 1042-dimensional feature vectors and 355-dimensional feature vectors;
FIG. 14 is a table indicating results of classifying the same to-be-classified document set through the same cluster analysis using 1042-dimensional feature vectors and 1043-dimensional feature vectors to which a result of character-string searching is added as an element;

FIG. 15 is a table indicating results of classifying the same to-be-classified document set through the same cluster analysis using 1042-dimensional feature vectors and 1074-dimensional feature vectors to which head IPC codes are added as elements;

FIG. 16 is a table indicating results of classifying the same to-be-classified document set through the same cluster analysis method with different numbers of clusters using 345-dimensional feature vectors and 126-dimensional feature vectors;

FIG. 17 is a table indicating results of document classification through latent topic analysis using an LDA method; and FIG. 18A is a table indicating results of classifying into six clusters through k-means clustering using 121-dimensional CS term feature vectors, and FIG. 18B is a table indicating results of classifying into three clusters through the same clustering using the same CS term feature vectors as that used in FIG. 18A.

DETAILED DESCRIPTION OF THE INVENTION

The methods described in Patent Document 1 and Non-Patent Document 1 may be able to find a document containing the content same as or similar to that of a specific document or a specific content in an easy manner or with a degree of accuracy. However, even by using such methods, it is difficult to exactly find the desired document. In most cases, to find the exact desired document, it is necessary to carefully read a certain number of documents.

Meanwhile, there may be a demand to perform some extensive searching to extract a set of several hundreds of documents, thereby analyzing and capturing a general picture of this set of documents such as a summary or tendency. In addition, in most cases, the set of documents extracted through a specific searching contains apparently unnecessary documents. In order to remove such noise documents in searching, it is necessary to read all the documents.

The present invention relates to a document classifying device, a method for classifying documents, a computer program that causes at least one computer to perform the method for classifying documents, and a computer readable storage medium that stores the computer program, which makes it easy to capture a general picture of a document set. This storage medium includes a non-transitory tangible medium. With the general picture being easily captured, it is possible to narrow down documents that should be carefully read or documents that should be paid attention to, or sort out priorities for careful reading, or the like.

Below, examples of preferred exemplary embodiment according to the present invention (hereinafter, referred to as the exemplary embodiment) will be described. Note that the exemplary embodiments described below are merely examples, and the present invention is not limited to the configurations of the exemplary embodiments below.

First, the outline of a document classifying device according to each of the exemplary embodiments described below, will be described.

Figure 1:
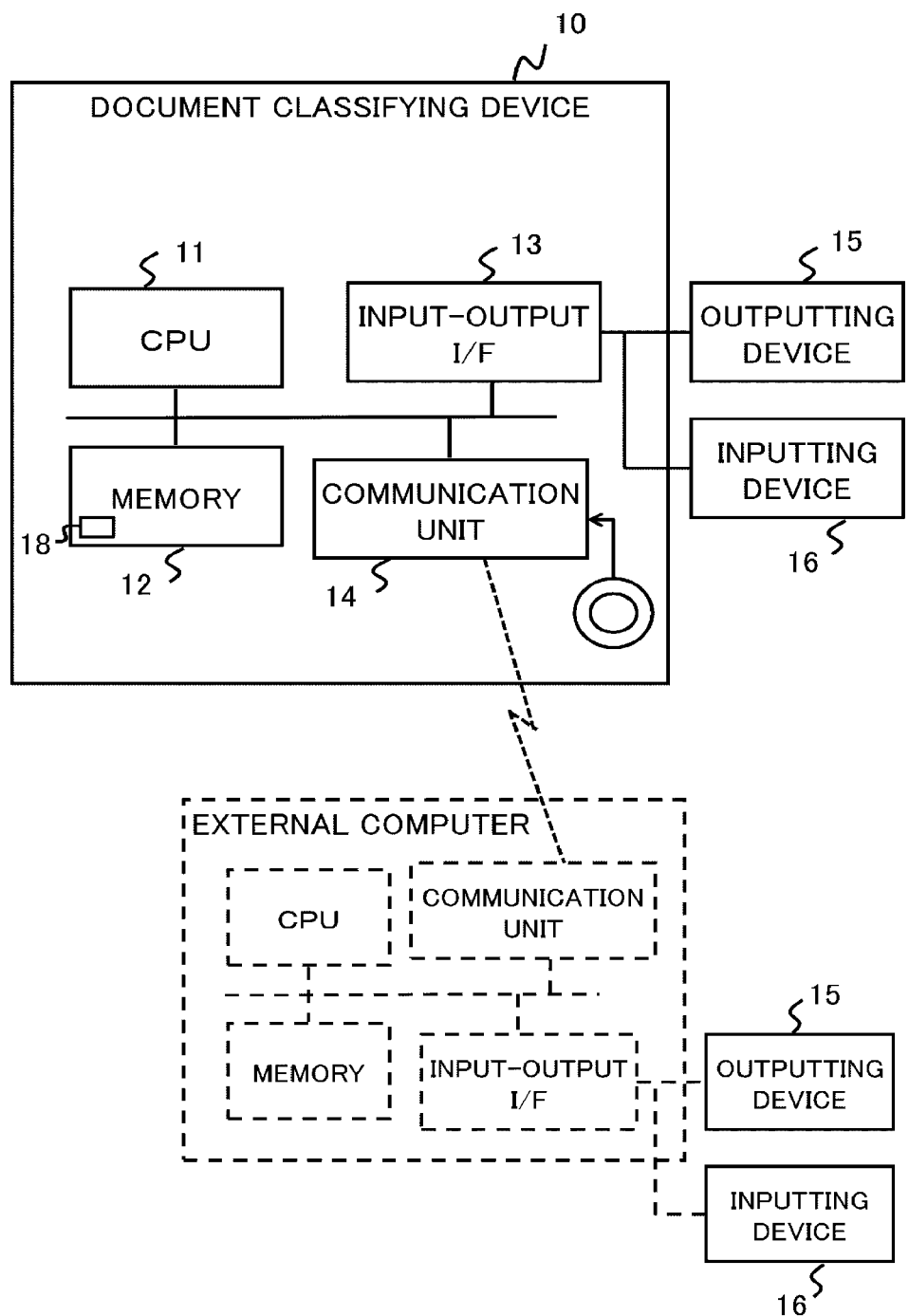
FIG. 1 is a diagram schematically illustrating an example of a hardware configuration of a document classifying device according to each exemplary embodiment.

FIG. 1 is a diagram schematically illustrating an example of a hardware configuration of a document classifying device 10 according to each of the exemplary embodiments (hereinafter, also referred to as the device 10).

The device 10 is a so-called computer (information processing device), and includes a central processing unit (CPU) 11, a memory 12, an input-output interface (I/F) 13, a communication unit 14, and the like, each of which is connected to each other, for example, through a bus. The number of individual hardware elements that constitute the device 10 is not limited, and it is also possible to collectively call these hardware elements an information processing circuit. In addition, the device 10 may include a hardware element or hardware elements, each of which is not illustrated in the drawing, and the hardware configuration thereof is not limited.

In addition to a general CPU, the CPU 11 may include an application-specific integrated circuit (ASIC), a digital signal processor (DSP), a graphics processing unit (GPU), and the like.

The memory 12 includes a random access memory (RAM), a read only memory (ROM), and an auxiliary storage device (hard disk or the like). The memory 12 stores a document classifying program (computer program) 18. The document classifying program 18 may be installed through the input-output I/F 13 or the communication unit 14 from a portable recording medium such as a compact disc (CD) or a memory card, or other computers on a network, and be stored in the memory 12.

The input-output I/F 13 can be connected to a user interface unit such as an outputting device 15 or an inputting device 16. The outputting device 15 includes at least one of a printing device, and a device that displays an image corresponding to drawing data processed, for example, with CPU 11, which includes a liquid crystal display (LCD) and a cathode ray tube (CRT) display. The inputting device 16 is a device that receives input of user operation, which includes a keyboard, a mouse, and the like. The outputting device 15 and the inputting device 16 may be integrated into one, and may be achieved as a touch screen.

The communication unit 14 performs communication with other computers through a communication network, or exchanges signals with other devices. A portable recording medium or the like can be connected to the communication unit 14.

The user interface of the device 10 may be achieved with the outputting device 15 and the inputting device 16 connected to the input-output I/F 13 of the device 10, or may be achieved with the outputting device 15 and the inputting device 16 of an external computer connected through the communication unit 14 of the device 10. In the former case, document classification information described below and generated in the device 10 is outputted from the outputting device 15 connected to the input-output I/F 13 of the device 10. In the latter case, the device 10 operates as a server device, and the document classification information generated in the device 10 is outputted from the outputting device 15 of the external computer that operates as a client device.

The document classifying device 10 according to each of the exemplary embodiments described below includes at least a document-set acquiring unit, a vector generating unit, a classifying unit, and a generating unit. In other words, each of document classifying devices 10 can perform a method for classifying a document, the method including a document-set acquiring process, a vector generating process, a classifying process, and a generating process. Each of these units and processes are achieved with the document classifying program 18 stored in the memory 12 and executed by the CPU 11.

The document-set acquiring unit (document-set acquiring process) acquires information regarding a to-be-classified document set in which classification codes based on multi-viewpoint classification are assigned to each document in advance.

The document-set acquiring unit may acquire information regarding the to-be-classified document set from an external computer, a device, a portable recording medium, or the like through the input-output I/F 13 or the communication unit 14, or may acquire it from a searching unit 21 in the document classifying device 10 as in the first exemplary embodiment described below. An acquiring unit 22 that will be described below is one specific example of the document-set acquiring unit.

Here, the "classification codes based on multi-viewpoint classification" mean code data configured to identify a classification system in which documents are classified from various viewpoints (multiple viewpoints). Thus, in documents to which at least one classification code based on multi-viewpoint classification is assigned, more than one classification code based on multi-viewpoint classification is assigned to most of the documents.

This type of classification code includes, for example, F-term code, CS code, and the like. As another example, it may be an evaluation code for evaluating documents from multiple viewpoints to perform classification. Specifically, it may be an evaluation code ("A5," "B3," "C2," or the like) that is formed by individual evaluation-item code with multi-viewpoint such as sentence construction "A," clarity "B," and accuracy (paucity of errors or the like) "C," and an evaluation point code from the highest "5" to the lowest "1". However, the type of classification code based on multi-viewpoint classification is not limited to such examples.

The "to-be-classified document set" means a set of documents to be classified. It is only necessary that each document in the to-be-classified document set is a document to which one or more classification codes based on multi-viewpoint classification are assigned in advance, and the content thereof is not particularly limited.

A vector generating unit (vector generating process) generates a multi-dimensional feature vector for each document in the to-be-classified document set, the multi-dimensional feature vector having, as elements, all or part of the classification codes assigned to the to-be-classified document set. A vector generating unit 23 that will be described below serves as a specific example of the vector generating unit.

No limitation is applied to the upper limit of the number of dimensions of the generated feature vector, provided that the number falls within a range allowed by computation load or data space. It is sufficient that the lower limit of this number of dimensions is greater than the number of classifications (the number of clusters).

In addition, all of the classification codes that are assigned to each document in the to-be-classified document set may be used as elements of the feature vector, or part of the classification codes may be used as elements of the feature vector. It is only necessary that the classification codes used as elements of the feature vector are suitably determined in accordance with desired classification specifications. For example, in a case where the to-be-classified document set is a set of documents extracted from the CSDB, all of the classification codes (from CC00 to CC09, from DD00 to DD15, from JJ00 to JJ78, and the like) assigned to each document in the set of documents may be used as elements of the feature vector, or part of the classification codes (only from JJ00 to JJ78) may be used as elements of the feature vector.

Furthermore, the "having, as elements, all or part of the classification codes" does not mean that the respective classification codes itself are set as element values of the feature vector but means that values (1/0) indicating whether or not the respective classification codes corresponding to the elements are assigned to the document or values obtained by weighting them are set as element values.

A classifying unit (classifying process) classifies the to-be-classified document set using the feature vector of each of the documents generated by the vector generating unit. A clustering unit 24 and a latent topic analyzing unit 27, which will be described below, serve as specific examples of the classifying unit.

No limitation is applied to the specific classification method performed by the classifying unit, provided that the to-be-classified document set can be classified into plural partial document sets using the multi-dimensional feature vector of which elements are the classification codes based on multi-viewpoint classification. In each of the exemplary embodiments described below, classification methods using cluster analysis and latent topic analysis are given as examples.

The generating unit (generating process) generates document classification information indicating results of the classification by the classifying unit. A generating unit 25 described below is one specific example of the generating unit.

No limitation is applied to specific details of the document classification information generated by the generating unit, provided that this information is information indicating results of classification of the to-be-classified document set. For example, the document classification information may be information in which classification identifying data (cluster number or the like) and document identifying data are associated with each other, the classification identifying data being configured to identify individual partial sets classified by the classifying unit, the document identifying data regarding each document that constitutes at least part of the to-be-classified document set.

The document classification information generated by the generating unit may be outputted through displaying to the outputting device 15, printing out, or the like, or may be transmitted to the outside through the input-output I/F 13 or the communication unit 14 as an electronic file.

As described above, in each of the exemplary embodiments described below, the multi-dimensional feature vector, which has classification codes based on multi-viewpoint classification as elements, is generated for each document in the to-be-classified document set. In addition, this feature vector is used to classify the to-be-classified document set. Since the pattern in which the classification codes based on multi-viewpoint classification are assigned to each document corresponds to the content of the document, it can be said that the feature vector using the classification codes as each element exhibits a characteristic of the content of the document. Thus, a set of documents classified using this feature vector is considered as a set of documents having a similar characteristic of content to each other.

Thus, by using the document classification information generated in each of the exemplary embodiments, it is possible to make it easy to capture the general picture of the to-be-classified document set. For example, by reading approximately several documents that belong to each partial set, it is possible to capture a tendency of content for each partial set, which makes it possible to capture the general picture of the to-be-classified document set. Furthermore, if the tendency of content can be captured for each partial set, it is possible to narrow documents to be carefully read, down to a certain partial set, thereby finding out documents containing the content same as or similar to that of a specific document or a specific content.

However, the method for classifying documents may not contain the generating process, and each of the processes described above may partially involve a human hand. For example, the classifying process may employ a configuration in which a specific analysis method is performed by a computer; a human considers an output of the results of the analysis method; and the human classifies each document or creates document classification information.

Below, the document classifying device 10 according to each of the exemplary embodiments will be described in detail.

For the purpose of convenience in description, each of the exemplary embodiments below gives an example in which patent documents are dealt with, and F-term code is used as a type of classification code based on multi-viewpoint classification. However, documents that the document classifying device 10 according to each of the exemplary embodiments can deal with are not limited to patent documents. In addition, the type of classification code based on multi-viewpoint classification is not limited to F-term code. Hereinafter, the "patent documents" are simply referred to as "documents."

In this specification, for the purpose of convenience, the "F-term code" represents a format including "theme code." Thus, the "F-term code" is expressed in an expression format including "five digits of theme code (alphanumeric characters)"+"two digits of viewpoint code (alphabets)"+ "two digits of numerals" or one alphanumeric character (called an additional code) placed at the end of the "two digits of numerals" described above. However, needless to say, in a case where the "F-term code" indicates a format that does not contain the "theme code," it can be executed.

FIRST EXEMPLARY EMBODIMENT

Document Classifying Device

The document classifying device 10 according to the first exemplary embodiment has a hardware configuration as illustrated in FIG. 1 as an example. As described above, the device 10 may operate as a server device, or may operate as a standalone device.

Figure 2:
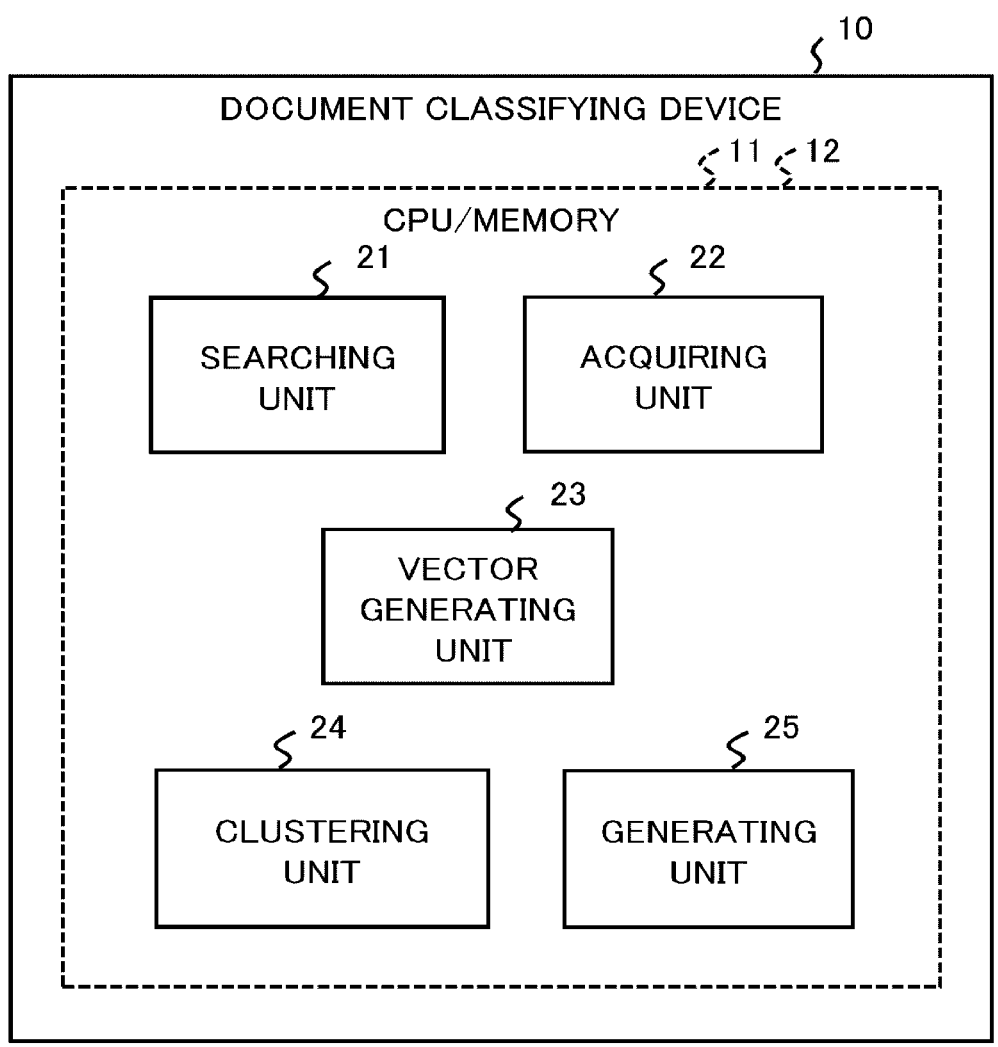
FIG. 2 is a block diagram schematically illustrating an example of a controlling configuration of a document classifying device according to a first exemplary embodiment.

FIG. 2 is a block diagram schematically illustrating an example of a controlling configuration of the document classifying device 10 according to the first exemplary embodiment.

The device 10 includes a searching unit 21, an acquiring unit 22, a vector generating unit 23, a clustering unit 24, and a generating unit 25. These are software elements (modules), and for example, are achieved with the document classifying program 18 stored in the memory 12 and executed by the CPU 11.

The searching unit 21 extracts document information regarding a to-be-classified document set from a document database that stores document information in which F-term codes are assigned to each document.

The document database may be stored in the memory 12 of the device 10, or may be stored in a memory of an external computer. In the latter case, the searching unit 21 may communicate with the external computer through the communication unit 14 to access the document database.

The searching unit 21 causes the outputting device 15 to display an input window for a search condition, acquires information (search query) regarding the search condition inputted into the input window through user operation using the inputting device 16, and can perform searching using the acquired information.

The acquiring unit 22 acquires the document information regarding the to-be-classified document set extracted by the searching unit 21. At this time, the acquiring unit 22 may acquire this document information in a format of electronic file that can be outputted to the outside, or may acquire raw data stored in the memory 12. The "acquire the document information" as used here can be translated into "carefully read the document information."

It is only necessary that the to-be-acquired document information contains document identifying data and data of F-term code for each document in the to-be-classified document set, and the specific details thereof are not limited. For example, in a case where the to-be-classified document set is patent documents, it is possible to acquire information such as an application number, an application publication number, a patent registered number, an applicant/right holder, IPC code, FI code, F-term code, abstract, claims, or the like.

The vector generating unit 23 generates a feature vector for each document in the to-be-classified document set, as described above.

At this time, the vector generating unit 23 may identify all of F-term codes contained in the document information acquired by the acquiring unit 22 and may generate feature vectors each having the identified F-term codes as elements. Alternatively, the vector generating unit 23 may identify part of all F-term codes contained in the document information acquired by the acquiring unit 22 and may generate feature vectors each having the identified F-term codes as elements. In this case, the vector generating unit 23 may cause the outputting device 15 to display all of F-term codes contained in this document information to cause a user to select F-term codes used as elements of the feature vectors from among them. In this case, it is only necessary for the vector generating unit 23 to generate feature vectors each having, as elements, the F-term codes selected by the user.

Figure 3:
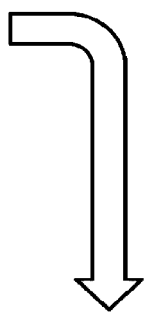
FIG. 3 is a schematic view illustrating a first generating concept of feature vectors.

FIG. 3 is a schematic view illustrating a first generating concept of feature vectors.

The upper portion of FIG. 3 illustrates a set of F-term codes to be used as elements of feature vectors. As illustrated in FIG. 3 as an example, the vector generating unit 23 generates a feature vector of each of the documents such that the number of F-term codes used as elements of the feature vector is set to be the number of elements of the feature vector as described above. For example, on the basis of the document information acquired by the acquiring unit 22, the vector generating unit 23 judges whether or not F-term codes corresponding to elements of the feature vectors are assigned to each document contained in the to-be-classified document set. In addition, the vector generating unit 23 sets "1" as an element value corresponding to the assigned F-term code and also sets "0" as an element value corresponding to the F-term code that is not assigned.

However, the element value is not always "1" or "0," and a weighting may be applied. For example, the vector generating unit 23 may assign a lighter weight to an element corresponding to an F-term code assigned to all the documents in the to-be-classified document set, and assign a heavier weight to an element corresponding to an F-term code assigned to not all but many documents in the to-be-classified document set. In addition, it may be possible to assign a heavier weight to an element corresponding to an F-term code to which attention is paid.

Moreover, the vector generating unit 23 may store, in an electronic file, a list of feature vectors before the weighting is applied as illustrated in FIG. 3 so that a user can perform editing. Furthermore, the vector generating unit 23 can cause the outputting device 15 to display the feature vectors before the weighting is applied, so as to be able to edit the feature vectors through user operation using the inputting device 16.

As described above, the F-term code is comprised, for example, of a theme code expressed as five digits of alphanumeric characters from the head, a viewpoint code expressed as two digits of alphabets, and a code of classification contents under a certain viewpoint expressed as two digits of numerals. In other words, it can be said that the F-term code has a hierarchical structure, and is formed of a partial code in each hierarchical level. Specifically, a partial code in the highest hierarchical level indicates the theme code. A partial code in the second highest hierarchical level indicates the viewpoint code (two digits of alphabets). A partial code in the third highest hierarchical level indicates a classification code (two digits of numerals) in a viewpoint. The additional code may be set to be a partial code in the lowest level.

Thus, it is possible to associate partial codes from the highest hierarchical level to a predetermined hierarchical level in the F-term code, with one element of the feature vectors. In other words, the vector generating unit 23 may generate feature vectors containing an element corresponding to a partial code from the highest hierarchical level to a predetermined hierarchical level in the classification codes, the partial code being part of the classification codes assigned to the to-be-classified document set.

Figure 4:
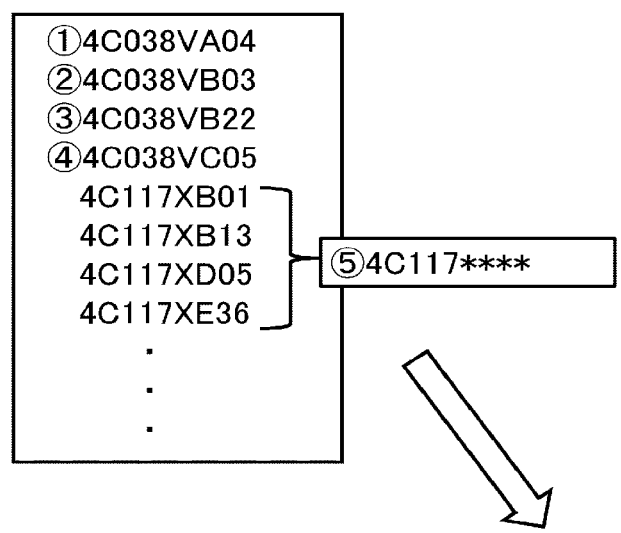
FIG. 4 is a schematic view illustrating a second generating concept of feature vectors.

FIG. 4 is a schematic view illustrating a second generating concept of feature vectors.

In the example of FIG. 4, the theme code "4C117" in the highest hierarchical level of the F-term codes is associated with one element of the feature vectors. Thus, in feature vectors of documents to which at least one of the F-term codes "4C117XB01," "4C117XB13," "4C117XD05," and "4C117XE36", each of which has a theme code "4C117," is assigned, a value of an element corresponding to the theme code "4C117" is set to be "1.".

This allows F-term codes for which specific information regarding detailed classification is not necessary, to be consolidated into one element, which makes it possible to perform classification that suits a purpose. In addition, since plural of F-term codes are collectively expressed as one element of the feature vectors, it is possible to reduce the number of elements of the feature vectors, which makes it possible to reduce the computation load.

Furthermore, the vector generating unit 23 may generate two or more feature vectors for each document in the to-be-classified document set. In other words, the vector generating unit 23 may generate a first feature vector for each document in the to-be-classified document set, the first feature vector having, as elements, part of the classification codes assigned to the to-be-classified document set, and also generate a second feature vector for each document in the to-be-classified document set or for each of part of documents in the to-be-classified document set, the second feature vector having, as elements, at least part of the remaining classification codes.

In a case where two or more feature vectors are generated for each document, it is preferable to use a group of the F-term codes having an orthogonality each other as one element of the feature vectors. The orthogonality between F-term codes as used herein means that no correlation exists between the F-term codes or they have a relationship having a low relevance. The classification code like the F-term code is based on multi-viewpoint classification, and hence, there may be viewpoints having a certain degree of correlation therebetween or having a low relevance therebetween. In the case of the example using the F-term, it can be said that different F-term codes in the hierarchical level lower than the theme code and the viewpoint code (seven digits) have an orthogonality to each other. By generating one feature vector using a group of the F-term codes having such an orthogonality, it is possible to generate feature vectors indicating a feature of each document in a high accurate manner.

Figure 5:
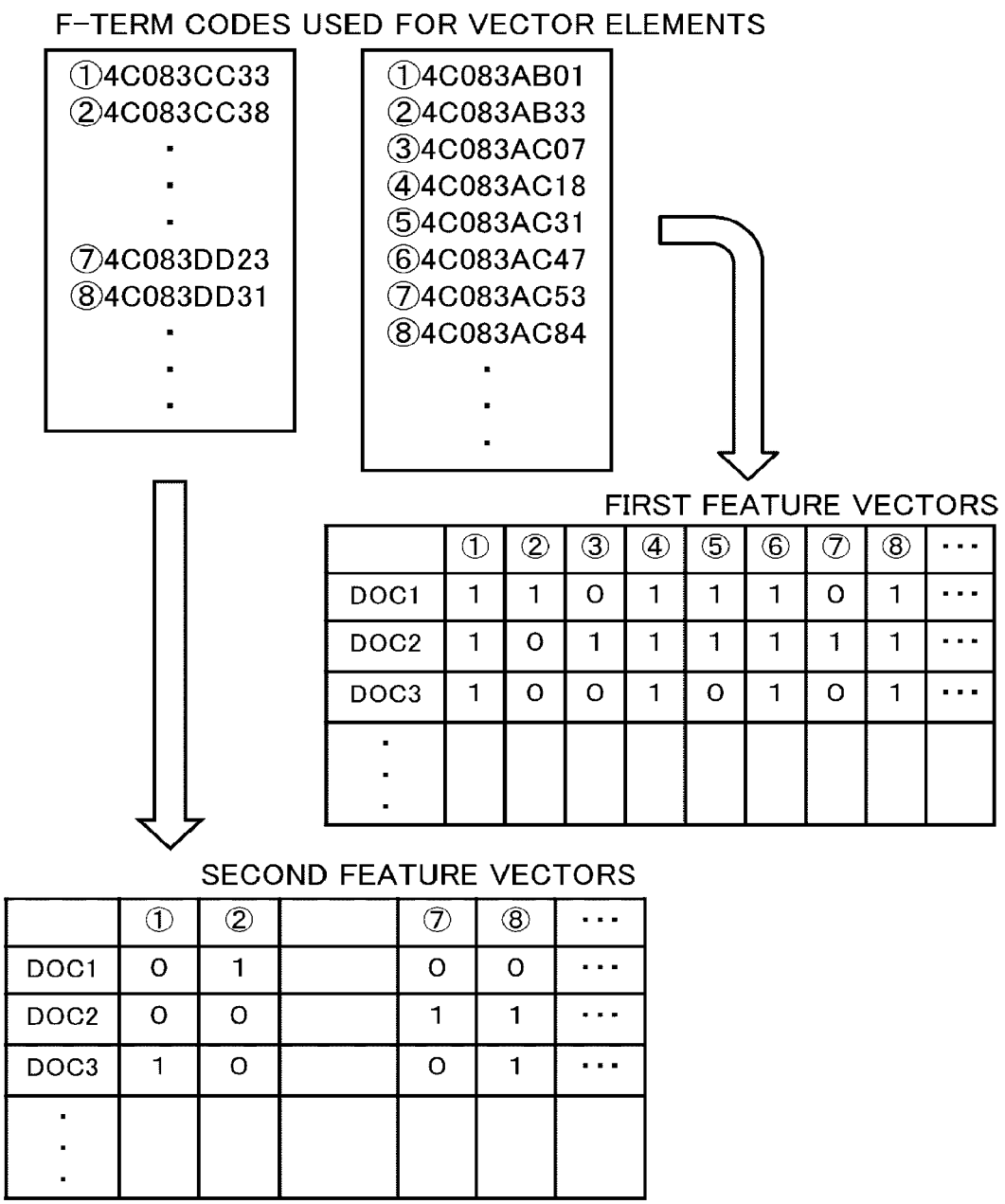
FIG. 5 is a schematic view illustrating a third generating concept of feature vectors.

FIG. 5 is a schematic view illustrating a third generating concept of feature vectors.

In the example of FIG. 5, the first feature vector is generated by using, as elements, F-term codes containing "4C083AA," "4C083AB," "4C083AC," and "4C083AD" of all of the F-term codes assigned to the to-be-classified document set. In addition, the second feature vector is generated by using, as elements, F-term codes containing "4C083CC" and "4C083DD" of all of the F-term codes. In this manner, the first and second feature vectors are each generated for each document in the to-be-classified document set.

The clustering unit 24 performs cluster analysis to the to-be-classified document set using the feature vectors generated by the vector generating unit 23 and classifies the to-be-classified document set into plural clusters. The cluster analysis includes various methods such as a minimum distance method (single linkage method), a maximum distance method (complete linkage method), a minimum variance method (Ward method), a median method, and a k-means method. No limitation is applied to a specific method of cluster analysis here.

For example, in a case of using the k-means method, the clustering unit 24 may be able to calculate the number of clusters using, for example, an Elbow method. In addition, the clustering unit 24 may cause the outputting device 15 to display an input window for the number of clusters and use the number of clusters inputted to the input window.

Furthermore, the clustering unit 24 may perform cluster analysis plural times to the to-be-classified document set using the feature vector for each document. In this case, the clustering unit 24 may perform cluster analysis using different numbers of clusters in each of the times, or may perform cluster analysis (ensemble clustering) plural times using different methods of cluster analysis (for example, the k-means method, the Ward method, and the like) in each of the times.

In a case where two or more feature vectors are generated for each document, the clustering unit 24 can perform a plurality of cluster analyses using each of the feature vectors. At this time, the clustering unit 24 may perform each of the cluster analyses to the to-be-classified document set using each of the feature vectors. In addition, the clustering unit 24 may also perform cluster analysis to the to-be-classified document set using one of the feature vectors for each document, and further perform cluster analysis to each of one or more classified clusters using the other of the feature vectors for each document. In other words, in a case where the first and second feature vectors are generated to each document, the clustering unit 24 may perform first classification to the to-be-classified document set using the first feature vector, and further perform second classification to the to-be-classified document set or at least one partial document set obtained as a result of the first classification using the second feature vector.

The generating unit 25 generates document classification information indicating a result of cluster analysis by the clustering unit 24. For example, the generating unit 25 can generate document classification information in which identifying data regarding each cluster classified through cluster analysis and document identifying data regarding each document that belongs to each cluster are associated with each other. At this time, the generating unit 25 may generate the document classification information by adding identifying data regarding each cluster to the document information regarding the to-be-classified document set acquired by the acquiring unit 22.

In a case where cluster analysis is performed plural times, the generating unit 25 generates document classification information in which plural pieces of cluster identifying data for each cluster analysis are associated with document identifying data regarding each document. In other words, the generating unit 25 generates document classification information in which first classification identifying data and second classification identifying data are associated with document identifying data regarding at least part of each document in the to-be-classified document set, the first classification identifying data being configured to identify each partial set classified through the first classification, the second classification identifying data being configured to identify each partial set classified through the second classification.

In this manner, results of multi-viewpoint classification are provided for each document to which clustering is performed plural times. This makes it possible to capture the general picture of the to-be-classified document set from multiple viewpoints.

The generating unit 25 can output the generated document classification information from the outputting device 15 through display, printing out, or the like. In addition, the generating unit 25 can convert the document classification information into a file format to store it in a server in order to store it in a portable recording medium or the like or send it to an external computer through communication.

Method for Classifying Document/Example of Operation

Below, a method for classifying documents according to the first exemplary embodiment will be described.

Figure 6:
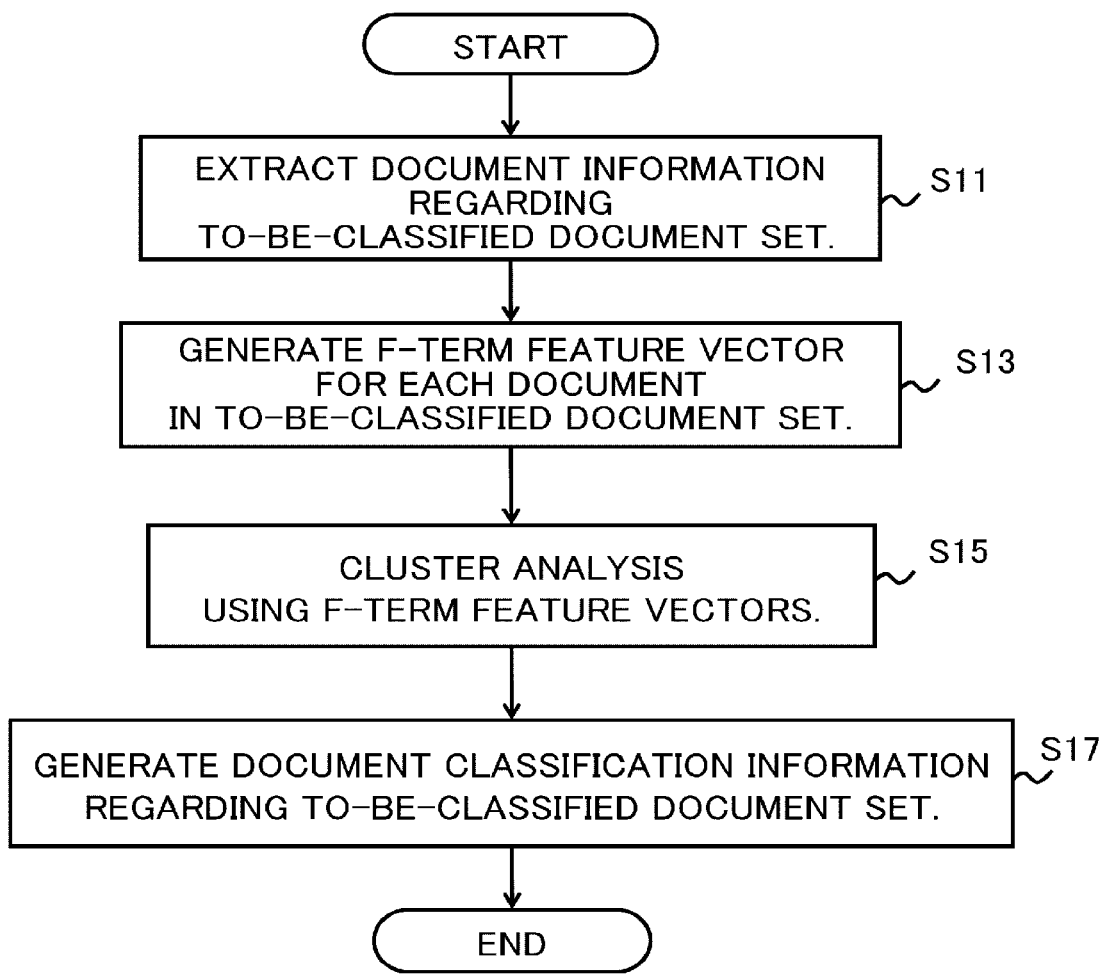
FIG. 6 is a flowchart indicating an example of operations performed by the document classifying device according to the first exemplary embodiment.

FIG. 6 is a flowchart indicating an example of operations performed by the document classifying device 10 according to the first exemplary embodiment. The method for classifying documents according to the first exemplary embodiment is performed by at least one computer such as the device 10. Each of the processes indicated in FIG. 6 is similar to details of processing by each of the above-described configurations of the device 10, and hence, explanation of details of each of the processes will not be repeated as appropriate.

The method for classifying documents according to the present exemplary embodiment includes a process (S11), a process (S13), a process (S15), and a process (S17).

The device 10 extracts document information regarding a to-be-classified document set from a document database that stores document information in which the F-term codes are assigned to each document (S11). At this time, the device 10 may acquire information regarding a search condition inputted by a user. In addition, as described above, in a case where the document database exists on an external computer (server device), the device 10 may request the computer to extract the document information by designating the search condition.

The device 10 generates a feature vector using the F-term codes for each document in the to-be-classified document set indicated by the document information extracted in the process (S11) (S13). At this time, the F-term codes used as elements of each of the feature vectors may be all of the F-term codes assigned to the to-be-classified document set, or may be part of the F-term codes. The device 10 can cause a user to select the F-term codes used as elements of each of the feature vectors.

The method for generating the feature vectors has been described above.

Next, the device 10 applies cluster analysis to the to-be-classified document set using the F-term feature vectors generated in the process (S13) and classifies the to-be-classified document set into plural clusters (S15). In a case where two or more feature vectors are generated for each document, the device 10 can perform a plurality of cluster analyses using each of the feature vectors.

The method of cluster analysis has been described above.

The device 10 generates document classification information regarding the to-be-classified document set on the basis of results of cluster analysis in the process (S15) (S17). The document classification information has been described above.

Such a method for classifying documents may be performed only by the device 10, or may be performed by plural devices (computers). For example, the process (S11) may be performed by an external computer whereas each of the other processes from (S13) to (S17) may be performed by the device 10.

Furthermore, each of the processes described above may partially involve a human hand. For example, a user may operate to designate the search condition in the process (S11) or to give an instruction to perform searching. In addition, in the process (S13), a user may assign a weight to the element of the feature vector or select an F-term used as an element of the feature vector.

SECOND EXEMPLARY EMBODIMENT

The first exemplary embodiment described above employs cluster analysis to classify the to-be-classified document set. A second exemplary embodiment described below employs another classification method called latent topic analysis. Below, a document classifying device and a method for classifying documents according to the second exemplary embodiment will be described with focus being placed on things different from the first exemplary embodiment. In the following description, details similar to those in the first exemplary embodiment will not be repeated as appropriate.

Document Classifying Device

The document classifying device 10 according to the second exemplary embodiment (hereinafter, also referred to as the device 10) has the hardware configuration illustrated as an example in FIG. 1. As described above, the device 10 may operate as a server device, or may operate as a standalone device.

Figure 7:
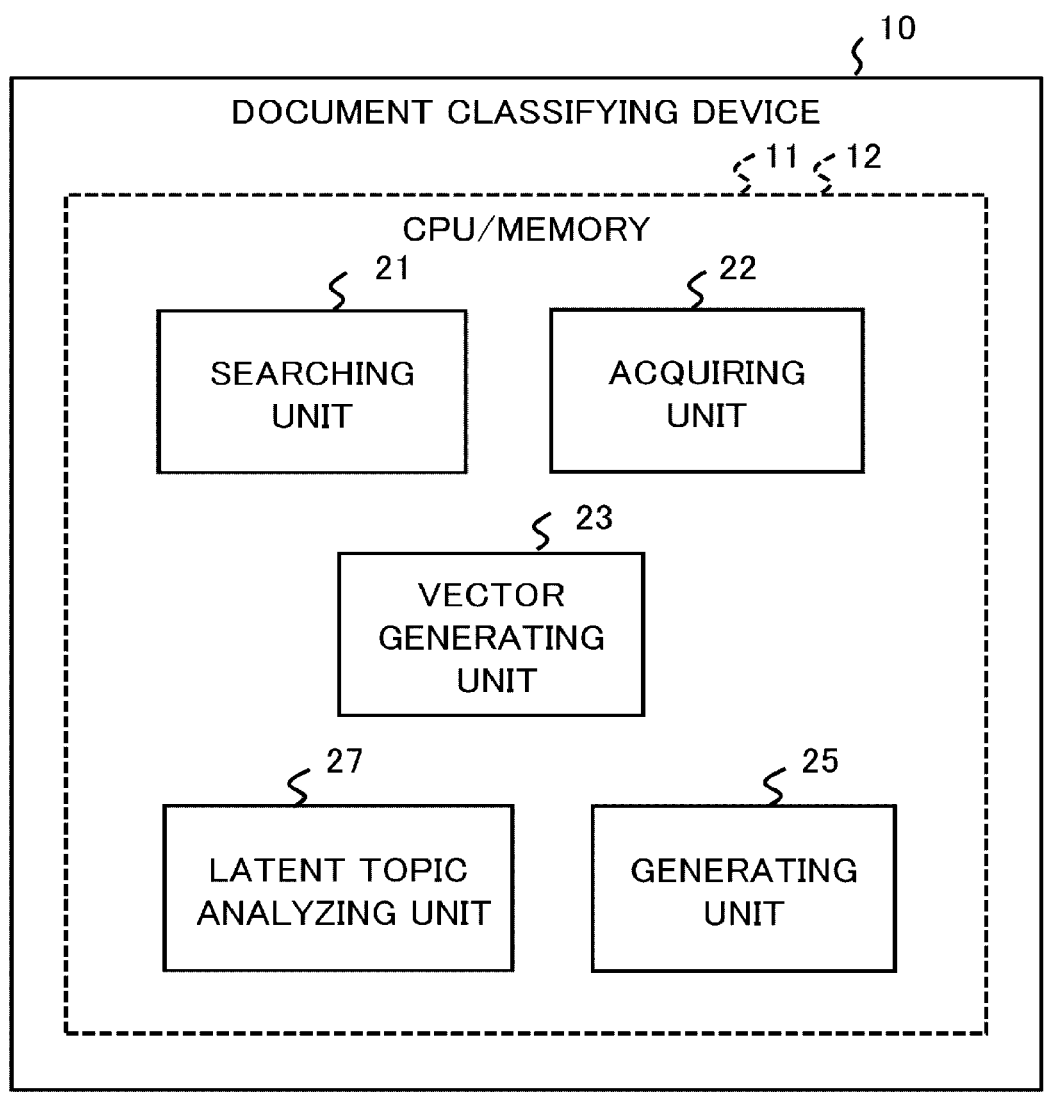
FIG. 7 is a block diagram schematically illustrating an example of a controlling configuration of a document classifying device according to a second exemplary embodiment.

FIG. 7 is a block diagram schematically illustrating an example of a controlling configuration of the document classifying device 10 according to the second exemplary embodiment.

Instead of the clustering unit 24 according to the first exemplary embodiment, the device 10 includes a latent topic analyzing unit 27. The latent topic analyzing unit 27 is also a software element (module), and is achieved, for example, with the document classifying program 18 stored in the memory 12 and executed by the CPU 11.

The latent topic analyzing unit 27 applies latent topic analysis to the feature vectors generated by the vector generating unit 23 and classifies the to-be-classified document set on the basis of results of this analysis.

The latent topic analysis is an analysis method based on the topic model typified by a latent dirichlet allocation (LDA) method. The topic model is a generic name of a method for finding topics from among a group of text data of documents.

The present inventors consider that each document is a set of topics, and also that the classification codes based on multi-viewpoint classification assigned to the document form at least one topic of the document. Thus, they found that, by using latent topic analysis, which is used mainly for document analysis, to classify a document set to which the classification codes based on multi-viewpoint classification are assigned, it is possible to appropriately classify the document set in accordance with the content thereof.

Figure 8:
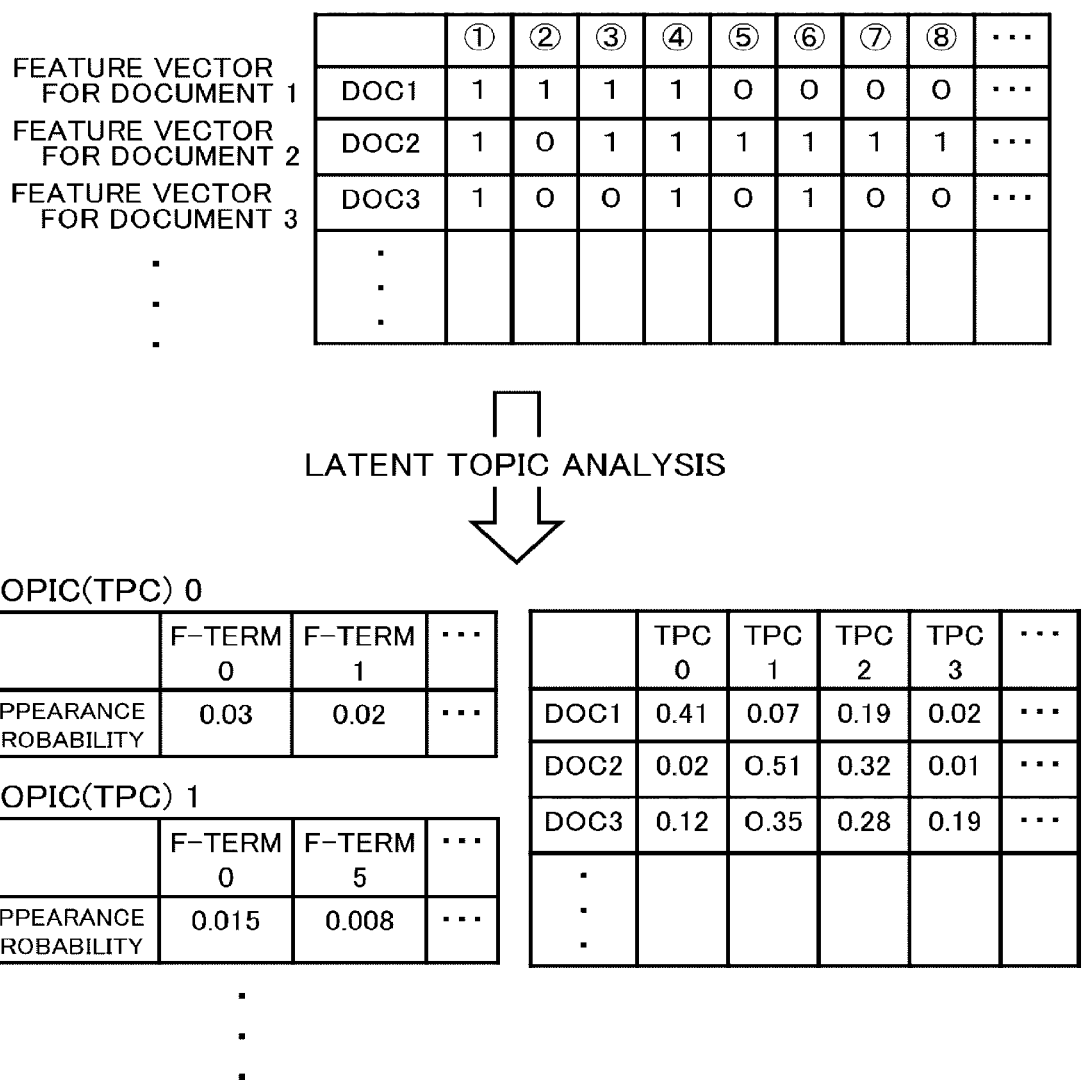
FIG. 8 is a schematic view of latent topic analysis.

FIG. 8 is a schematic view of latent topic analysis.

As illustrated in FIG. 8, the latent topic used here is expressed as a distribution of appearance probability of the classification codes (F-term codes or the like) based on multi-viewpoint classification, and a combination ratio of latent topics is calculated for each document in the to-be-classified document set through latent topic analysis.

In other words, the latent topic analyzing unit 27 performs latent topic analysis using, as an input, the feature vector of each document indicating whether each of the F-term codes is assigned, thereby outputting a latent topic list expressed as a distribution of appearance probability of the F-term codes and also outputting a combination ratio of latent topics regarding each document in the to-be-classified document set. The latent topic analyzing unit 27 applies latent topic analysis using latent topics expressed as a distribution of appearance probability of the classification codes, to the feature vector of each document in the to-be-classified document set, thereby calculating a combination ratio of latent topics for each document in the to-be-classified document set.

The latent topic analyzing unit 27 can classify the to-be-classified document set on the basis of the combination ratio of latent topics calculated through latent topic analysis. For example, the latent topic analyzing unit 27 can select, as a representative topic of the document, a latent topic indicating the highest ratio from among the combination ratios of latent topics, to classify, for each latent topic, the to-be-classified document set using a set of documents having the latent topic as a representative topic.

Furthermore, it is possible to perform classification using a threshold value of latent topics. Ina case where there are plural latent topics having a ratio higher than the threshold value concerning one document, it is possible to decide the plural topics as representative topics for the document. In this case, this document is considered to belong to plural classifications. In addition, it is possible to classify documents that does not belong to any classification.

The number of topics for latent topic analysis may be set in advance, or may be inputted by a user. In the latter case, the latent topic analyzing unit 27 can cause the outputting device 15 to display an input window for the number of topics and acquire the number of topics inputted through this input window.

In addition, the latent topic analyzing unit 27 may perform latent topic analysis using the certain number of topics, automatically change the number of topics on the basis of a combination ratio of latent topics of each document obtained as a result of the latent topic analysis, and perform latent topic analysis again using the changed number of topics.

The latent topic analyzing unit 27 may perform latent topic analysis a plurality of times with the number of topics being changed. In this case, it is only necessary that each document is classified for each result of the latent topic analyses.

In the present exemplary embodiment, the generating unit 25 can generate document classification information in which identifying data regarding the latent topic set as a representative topic and identifying data regarding a document are associated with each other. In a case of a document having plural representative topics, it is only necessary that identifying data regarding plural latent topics are associated. Similarly, in a case where latent topic analysis is performed plural times, it is only necessary that identifying data regarding plural latent topics are associated with identifying data regarding each document.

Method for Classifying Documents/Example of Operation

Below, a method for classifying documents according to the second exemplary embodiment will be described.

Figure 9:
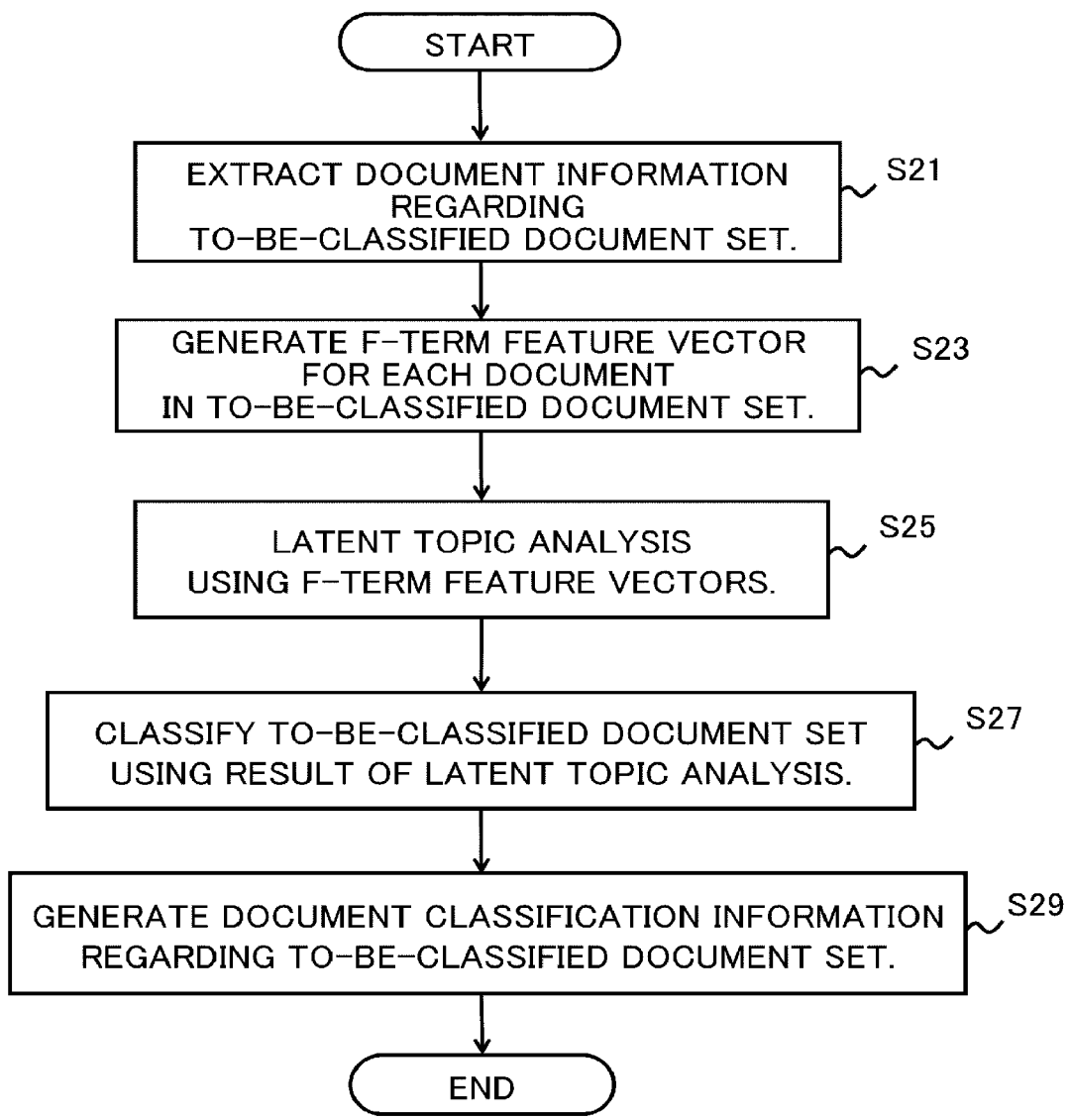
FIG. 9 is a flowchart indicating an example of operations performed by the document classifying device according to the second exemplary embodiment.

FIG. 9 is a flowchart indicating an example of operations performed by the document classifying device 10 according to the second exemplary embodiment. The method for classifying documents according to the second exemplary embodiment is performed by at least one computer such as the device 10. Each of the processes illustrated in FIG. 9 is similar to details of processes by each of the configurations described above that the device 10 has. Thus, explanation of details of each of the processes will not be repeated as appropriate.

The method for classifying documents according to the present exemplary embodiment includes a process (S21), a process (S23), a process (S25), a process (S27), and a process (S29). The process (S21) and the process (S23) are similar to the process (S11) and the process (S13) illustrated in FIG. 6.

In the second exemplary embodiment, the device 10 applies latent topic analysis to the feature vectors using the F-term codes generated in the process (S23) (S25). The method for latent topic analysis has been described above. As a result of the latent topic analysis, a combination ratio of latent topics regarding each document in the to-be-classified document set is calculated.

At this time, the device 10 may cause a user to designate the number of topics for the latent topic analysis, or may automatically decide it.

Next, the device 10 classifies the to-be-classified document set on the basis of the combination ratio of latent topics for each document calculated in the process (S25) (S27). The method of classification in the process (S27) has been described above (latent topic analyzing unit 27).

The device 10 generates document classification information regarding the to-be-classified document set on the basis of results of classification in the process (S27) (S29). The method of generating the document classification information has been described above (generating unit 25).

However, the process (S27) and the process (S29) may involve a human hand. For example, the device 10 may cause the outputting device 15 to display a combination ratio of latent topics for each document, and cause a user to designate classification of each document on the basis of the display. At this time, the user may input identifying data regarding each classification for each document. In addition, the device 10 may create an electronic file that stores a combination ratio of latent topics for each document, and cause a user to input, into the electronic file, identifying data regarding each classification for each document. Furthermore, the process (S21) and the process (S23) may involve a human hand as described in the first exemplary embodiment.

In this manner, according to the second exemplary embodiment, latent topic analysis using the latent topics expressed as a distribution of appearance probability of the classification codes (F-term codes) is used as a document classification method, thereby classifying the to-be-classified document set on the basis of the combination ratio of latent topics for each document. By using latent topic analysis, it is also possible to obtain an effect similar to that obtained with the first exemplary embodiment.

MODIFICATION EXAMPLE

The method for generating feature vectors is not limited to the example as described above. It is possible to make modification in various manners, provided that the method employs the classification codes (F-terms or the like) based on multi-viewpoint classification.

It may be possible to add at least one element other than the F-term codes, to the feature vectors.

For example, in addition to the F-term codes, at least one classification code such as IPC code or FI code is assigned to each of patent documents. The IPC and the FI are code systems configured to collectively classify main themes of documents, and are also called classification codes based on single viewpoint classification. In a case where, in addition to the classification codes based on multi-viewpoint classification, at least one different-type classification code based on a different type of classification configured to collectively classify main themes of the content of documents is assigned to each document in the to-be-classified document set, it may be possible to add, to the feature vectors, elements indicating whether or not the different-type classification codes are assigned.

In this case, the vector generating unit 23 generates feature vectors each having, as elements, all or part of the classification codes based on multi-viewpoint classification assigned to the to-be-classified document set, and also each having, as elements, all or part of a plurality of the different-type classification codes assigned to the to-be-classified document set. In each of the embodiments described above, it may be possible to generate feature vectors further including, as elements, all or part of the IPC codes, the FI codes or both of them assigned to the to-be-classified document set.

With an element corresponding to classification codes of a different type of classification configured to collectively classify main themes of documents being further added to each feature vector, it is possible to generate each feature vector indicating a feature of each document in a highly accurate manner, and it is also possible to improve the accuracy of classification of documents.

As another example, it may be possible to add the existence or absence of a predetermined keyword in each document, to an element of the feature vectors. In addition, it may be possible to add, as an element, the existence or absence of a predetermined keyword in a predetermined portion (Section of Claims, Abstract, Problem to be Solved by the Invention, or the like) in each document.

Figure 10:
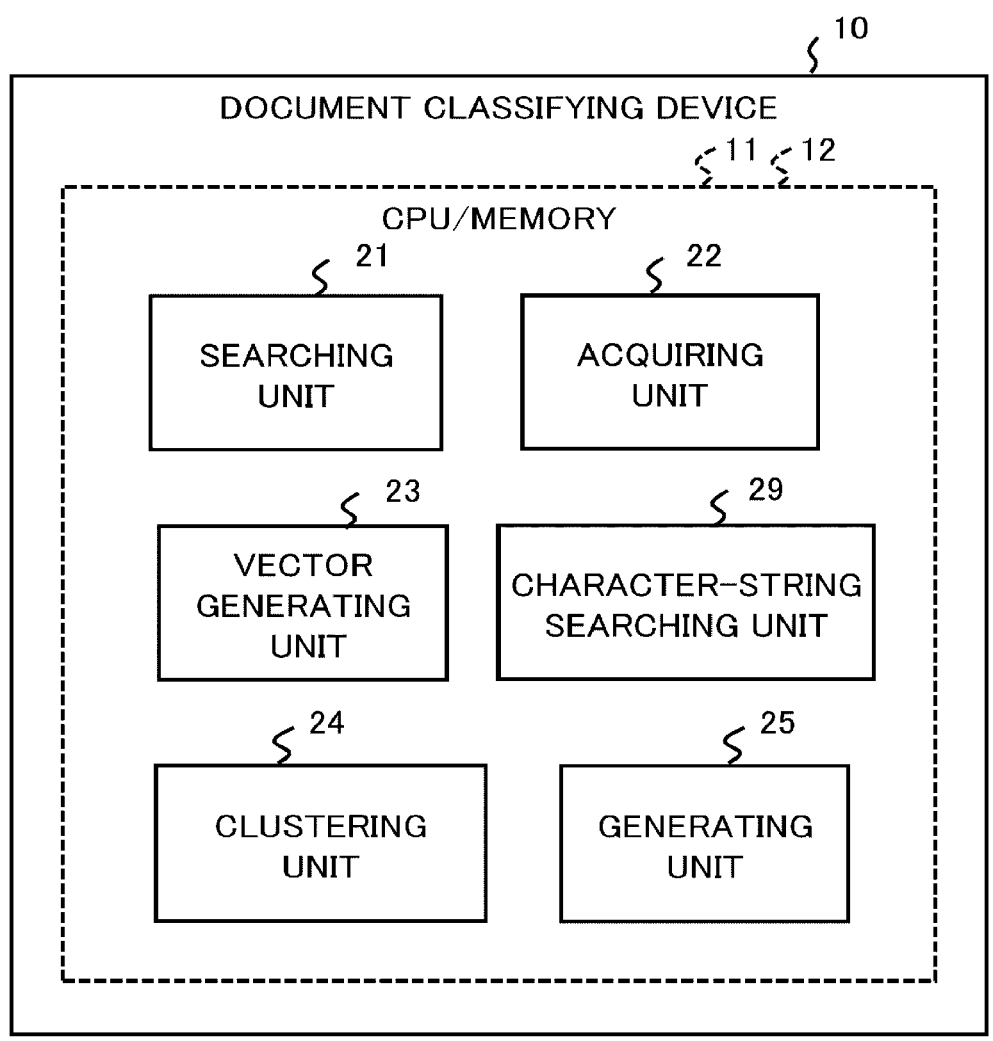
FIG. 10 is a block diagram schematically illustrating an example of a controlling configuration of a document classifying device according to a modification example.

FIG. 10 is a block diagram schematically illustrating an example of a controlling configuration of a document classifying device 10 according to the modification example. As illustrated in FIG. 10, the document classifying device 10 according to each of the exemplary embodiments may further include a character-string searching unit 29 that searches for a predetermined character string in each document in the to-be-classified document set. The character-string searching unit 29 is also a software element (module), and is achieved, for example, with the document classifying program 18 stored in the memory 12 and executed by the CPU 11. The modification example of the document classifying device 10 according to the first exemplary embodiment is illustrated in FIG. 10. However, needless to say, the document classifying device 10 according to the second exemplary embodiment is also able to be modified in a similar manner.

The character string (search character string) used for searching may be determined in advance, or may be designated by a user. In the latter case, the character-string searching unit 29 may cause the outputting device 15 to display an input window for a search character string and acquire character string data inputted through this input window. For example, a user can designate a search character string that corresponds to the purpose of classification of documents.

The character-string searching unit 29 extracts document identifying data regarding each document from document information regarding the to-be-classified document set acquired by the acquiring unit 22, and searches the document database again using the list of the document identifying data and this search character string as search conditions. This makes it possible to judge whether or not the search character string exists in each document in the to-be-classified document set.

In a case where data (description data such as Claims, and Abstract) serving as a search source in each document in the to-be-classified document set are acquired by the acquiring unit 22, the character-string searching unit 29 may search the data acquired by the acquiring unit 22 for a search character string.

The vector generating unit 23 generates each feature vector further including an element corresponding to a result of searching for a search character string. For example, the vector generating unit 23 sets an element value indicating whether or not the search character string is contained.

In addition to the classification codes (F-term codes or the like) based on multi-viewpoint classification, the vector generating unit 23 can generate feature vectors each having elements as to both whether or not such a search character string is contained and whether or not the different-type classification codes of a different type of classification described above are assigned.

By further adding an element corresponding to a result of searching for a search character string to the feature vectors as described above, it is possible to generate the feature vectors matching the purpose of classification and indicating features of documents in a highly accurate manner, and it is also possible to classify documents in a desirable manner for a user.

Furthermore, by using the feature vector for each document, the feature vector being generated by the vector generating unit 23, it is possible to obtain a similarity degree between documents, a similarity degree between a document and a cluster, a similarity degree between clusters, or the like. For example, as a similarity degree between documents, it is possible to calculate a cosine similarity (cosine distance) of feature vectors for each document. In addition, it is possible to calculate an average value of similarity degrees between a feature vector of each document that belongs to a certain cluster and a feature vector of a certain document to set this average value to be a similarity degree between the cluster and the certain document. Similarly, it is also possible to calculate an average value of similarity degrees between a feature vector of each document that belongs to a certain cluster and a feature vector of each document that belongs to another cluster to set this average value to be a similarity degree between clusters.

It may be possible to automatically determine the number of clusters in cluster analysis or the number of topics in latent topic analysis so that the similarity degree between documents, the similarity degree between a document and a cluster, or the similarity degree between clusters as described above is equal to or more than a threshold value. Furthermore, by using a similarity degree between a document and a cluster, it is also possible to perform rating, for example, as to which cluster a certain document is close to from among the clusters that have already been classified.

Furthermore, it may be possible to combine the exemplary embodiments and the modification examples described above within a range in which details thereof do not contradict each other. For example, the first exemplary embodiment and the second exemplary embodiment described above can be combined with each other. In this case, both classification (clustering) using cluster analysis and classification using latent topic analysis are performed, and each document in the to-be-classified document set is associated with a cluster number and a latent topic number.

In addition, the document classifying device 10 according to each of the exemplary embodiments described above may include a configuration other than the configurations illustrated in the drawings, or may not include a portion of the configurations illustrated in the drawings. For example, the searching unit 21 may be achieved on another computer that can communicate with the document classifying device 10. In this case, the acquiring unit 22 of the document classifying device 10 can acquire document information regarding a to-be-classified document set extracted by the searching unit 21 from another computer.

It may be possible to define part of or all of the exemplary embodiments and the modification examples described above in the following manner. However, the exemplary embodiments and the modification examples described above are not limited to the following description.

<1> A document classifying device including:
a document-set acquiring unit that acquires information regarding a to-be-classified document set in which classification codes based on multi-viewpoint classification are assigned to each document in advance;
a vector generating unit that generates a multi-dimensional feature vector for each document in the to-be-classified document set, the multi-dimensional feature vector having, as elements, all or part of the classification codes assigned to the to-be-classified document set;
a classifying unit that classifies the to-be-classified document set using the feature vector of each document in the to-be-classified document set; and
a generating unit that generates document classification information indicating a result of the classification.

<2> The document classifying device according to <1>, further including:
a character-string searching unit that searches for a predetermined character string in each document in the to-be-classified document set, in which
the vector generating unit generates the feature vector further including an element corresponding to a result of searching for the predetermined character string.

<3> The document classifying device according to <1> or <2>, in which
in addition to the classification codes, different-type classification codes based on a different type of classification configured to collectively classify main themes of content of documents are assigned to each document in the to-be-classified document set, and
the vector generating unit generates the feature vector further including, as elements, all or part of the different-type classification codes assigned to the to-be-classified document set.

<4> The document classifying device according to any one of <1> to <3>, in which
the classifying unit:
calculates a combination ratio of latent topics of each document in the to-be-classified document set by applying latent topic analysis to the feature vector of each document in the to-be-classified document set, the latent topic analysis using the latent topics expressed as a distribution of appearance probability of the classification codes; and
classifies the to-be-classified document set on the basis of the calculated combination ratio of the latent topics.

<5> The document classifying device according to any one of <1> to <4>, in which
the vector generating unit:
generates a first feature vector for each document in the to-be-classified document set, the first feature vector having, as elements, part of the classification codes assigned to the to-be-classified document set; and
further generates a second feature vector for each document in the to-be-classified document set or in part of the to-be-classified document set, the second feature vector having, as elements, at least part of the remaining classification codes,
the classifying unit:
performs first classification to the to-be-classified document set using the first feature vector; and
further performs second classification to the to-be-classified document set or at least one partial document set obtained as a result of the first classification using the second feature vector.

<6> The document classifying device according to <5>, in which
the generating unit generates the document classification information in which first classification identifying data and second classification identifying data are associated with document identifying data for each document in at least part of the to-be-classified document set, the first classification identifying data being configured to identify each partial set classified through the first classification, the second classification identifying data being configured to identify each partial set classified through the second classification.

<7> The document classifying device according to <1> to <6>, in which
each of the classification codes has a hierarchical structure and is formed of a partial code in each hierarchical level, and
the vector generating unit generates the feature vector including an element corresponding to a partial code from a highest hierarchical level to a predetermined hierarchical level in each of classification codes in part of the classification codes assigned to the to-be-classified document set.

<8> The document classifying device according to any one of <1> to <7>, further including:
a searching unit that extracts document information regarding the to-be-classified document set from a document database that stores document information in which the classification codes are assigned to each document, in which
the document-set acquiring unit acquires the document information regarding the to-be-classified document set extracted by the searching unit.

<9> A method for classifying documents, including the processes of:
acquiring information regarding a to-be-classified document set in which classification codes based on multi-viewpoint classification are assigned to each document in advance;
generating a multi-dimensional feature vector for each document in the to-be-classified document set, the multi-dimensional feature vector having, as elements, all or part of the classification codes assigned to the to-be-classified document set; and
classifying the to-be-classified document set using the feature vector of each document in the to-be-classified document set.

<10> The method for classifying documents according to <9>, further including the process of:
searching for a predetermined character string in each document in the to-be-classified document set, in which
the vector generating process includes generating the feature vector further including an element corresponding to a result of searching for the predetermined character string.

<11> The method for classifying documents according to <9> or <10>, in which
in addition to the classification codes, different-type classification codes based on a different type of classification configured to collectively classify main themes of content of documents are assigned to each document in the to-be-classified document set, and
the vector generating process includes generating the feature vector further including, as elements, all or part of the different-type classification codes assigned to the to-be-classified document set.

<12> The method for classifying documents according to any one of <9> to <11>, in which, the classifying process includes:
calculating a combination ratio of latent topics of each document in the to-be-classified document set by applying latent topic analysis to the feature vector of each document in the to-be-classified document set, the latent topic analysis using the latent topics expressed as a distribution of appearance probability of the classification codes; and
classifying the to-be-classified document set on the basis of the calculated combination ratio of the latent topics.

<13> The method for classifying documents according to any one of <9> to <12>, in which
the vector generating process includes:
generating a first feature vector for each document in the to-be-classified document set, the first feature vector having, as elements, part of the classification codes assigned to the to-be-classified document set; and
further generating a second feature vector for each document in the to-be-classified document set or in part of the to-be-classified document set, the second feature vector having, as elements, at least part of the remaining classification codes, and the classifying process includes:
performing first classification to the to-be-classified document set using the first feature vector; and
further performing second classification to the to-be-classified document set or at least one partial document set obtained as a result of the first classification using the second feature vector.

<14> The method for classifying documents according to <13>, further including:
generating document classification information in which first classification identifying data and second classification identifying data are associated with document identifying data for each document in at least part of the to-be-classified document set, the first classification identifying data being configured to identify each partial set classified through the first classification, the second classification identifying data being configured to identify each partial set classified through the second classification.

<15> The method for classifying documents according to any one of <9> to <14>, in which
each of the classification codes has a hierarchical structure and is formed of a partial code in each hierarchical level, and
the vector generating process includes generating the feature vector including an element corresponding to a partial code from a highest hierarchical level to a predetermined hierarchical level in each of classification codes in part of the classification codes assigned to the to-be-classified document set.

<16> A computer program that causes at least one computer to perform the method for classifying documents according to any one of <9> to <15>.

Examples will be given below to explain details described above in more detail. However, description of Examples below is not intended to impose any limitation to details described above. With Examples below, examination was performed as to usefulness of results of document classification using various feature vectors and various analysis methods.

EXAMPLE 1

NRI Cyber Patent Desk 2 provided by NRI Cyber Patent, Ltd. was used as a document database. Publicly available patent publications in this document database are searched under searching conditions where "A61K008" for the head IPC code (latest), the F-term code (latest) "4C083cc36," and the character string "direct dyes" in Abstract are set with the AND operator. As a result, 289 patent documents were extracted as a to-be-classified document set. There were 1042 F-term codes assigned to this to-be-classified document set.

1042-dimensional feature vectors, which has, as elements, all of the F-term codes assigned to the to-be-classified document set, were generated. At this time, in a case where each of the F-term codes was assigned to each document, an element value corresponding to the F-term code was set to be "1," whereas, in a case where each of the F-term codes was not assigned, an element value thereof was set to be "0." Then, k-means clustering was performed using these feature vectors to classify each document in the to-be-classified document set into eight clusters. Scikit-learn library package in Python language was used in clustering processing.

FIG. 11 indicates tables indicating results of document classification in Example 1. FIG. 11A is a table indicating the number of documents for each cluster concerning each of five applicants. FIG. 11B is a table indicating statistical information regarding the similarity degree between one certain document by applicant A and other documents, the statistical information being indicated for each cluster.

From FIG. 11A, it can be understood that, in each of the applicants, some clusters have a large number of documents and some clusters do not have a large number of documents. In a case of the applicant A, documents are concentrated on the cluster (CL) 0 and the cluster (CL) 4. In a case of the applicant B, documents are concentrated on the cluster (CL) 4. In a case of the applicant D, documents are concentrated on the cluster (CL) 1, the cluster (CL) 3, and the cluster (CL) 6. In a case of the applicant E, documents are concentrated on the cluster (CL) 3. In other words, it can be understood that, with the document classification according to the present example, the distribution of documents in each cluster exhibits a characteristic for every applicant.

In FIG. 11B, one document classified into the cluster 2 of the applicant A was selected to calculate similarity degrees between this document and other documents using a cosine similarity method in the Scikit-learn library package in Python language.

From FIG. 11B, it can be understood that the cluster 2, to which the selected document belongs, is the largest in terms of the average value, the maximum value, and the minimum value of the similarity degree. Furthermore, when the average similarity degree between the cluster 2 and other clusters are compared, it is possible to see a sense of distance between the cluster 2 and other clusters.

Thus, with the document classification through k-means clustering using the 1042-dimensional F-term feature vectors, it is possible to confirm that the to-be-classified document set is appropriately classified in accordance with characteristics of each document.

Furthermore, 289 documents as the to-be-classified document sets described above were classified into eight clusters through agglomerative clustering which is a different type of cluster analysis method. The 1042-dimensional F-term feature vectors described above were used in this clustering. Scikit-learn library package in Python language was used in this clustering processing.

FIG. 12 is a table indicating results of classifying the same to-be-classified document set through k-means clustering and agglomerative clustering.

From FIG. 12, it can be understood that, in the matrix concerning results of two cluster analyses, some cells include many documents and other cells does not include many documents. For example, most of document sets classified through k-means clustering into the cluster (CL) 1 are classified into the cluster (CL) 4 through agglomerative clustering. On the contrary, documents classified into the cluster (CL) 4 through agglomerative clustering are all classified into the cluster (CL) 1 through k-means clustering. In other words, each of the clusters classified through k-means clustering and each of the clusters classified through agglomerative clustering exhibit a certain degree of correlation between them.

Thus, it is confirmed that, not only by using k-means method but also by using a different type of cluster analysis method, it is possible to appropriately classify documents.

Furthermore, 355-dimensional feature vectors, in which not all (1042 codes) of the F-term codes assigned to the to-be-classified document set were set as elements, and part (355 codes) of the F-term codes were set as elements, were generated. By using these feature vectors, document classification was performed through k-means clustering. At this time, the to-be-classified document set is similar to that described above (289 documents). In addition, the F-term codes containing the theme code "4C083" were used as an element of each feature vector. In a case where at least one F-term code containing the theme code "4C083" was assigned, an element value corresponding to the F-term code was set to be "1," whereas, in a case where at least one F-term code was not assigned, an element value thereof was set to be "0."

FIG. 13 is a table indicating results of classifying the same to-be-classified document set through the same cluster analysis using 1042-dimensional feature vectors in which all of the F-term codes are set for elements and also using 355-dimensional feature vectors in which part of the F-term codes are set for elements.

From the results in FIG. 13, it can be understood that, by using any of the feature vectors, it is possible to perform characteristic classification. This confirms that, even by using the feature vectors generated using part of the F-term codes assigned to the to-be-classified document set, it is possible to appropriately classify documents.

Furthermore, 1043-dimensional feature vectors were generated, these feature vectors further having an element corresponding to whether or not the search character string "dyed hair" is contained in the description of Claims along with the elements corresponding to all (1042 codes) of the F-term codes assigned to the to-be-classified document set. By using these feature vectors, document classification was performed through k-means clustering. At this time, the to-be-classified document set is similar to that described above (289 documents). At this time, in a case where each F-term code was assigned to each document, an element value corresponding to the F-term code was set to be "1." In a case where each F-term code was not assigned, an element value thereof was set to be "0." In a case where the search character string "dyed hair" was contained in Claims, the corresponding element value was set to be "2." In a case where the search character string "dyed hair" was not contained, the element value thereof was set to be "0." In other words, the feature vectors were used in which weighting was applied to an element corresponding to a result of searching for the search character string.

FIG. 14 is a table indicating results of classifying the same to-be-classified document set by the same cluster analysis using the 1042-dimensional feature vectors in which all of the F-term codes are set for elements and the 1043-dimensional feature vectors in which the results of character-string searching are added for an element.

From results in FIG. 14, it can be understood that, by using any of the feature vectors, it is possible to perform characteristic classification. This confirms that, even by using the feature vectors containing not only an element corresponding to the F-term code but also a result of character-string searching as an element, it is possible to appropriately classify documents.

Furthermore, 1074-dimensional feature vectors were generated, these feature vectors each having elements corresponding to head IPC codes in the to-be-classified document set along with the elements corresponding to all of the F-term codes (1042 codes) assigned to a to-be-classified document set. By using these feature vectors, document classification was performed through k-means clustering. There are 32 codes as the head IPC codes, and the to-be-classified document set is similar to that described above (289 documents).

FIG. 15 is a table indicating results of classifying the same to-be-classified document set through the same cluster analysis using the 1042-dimensional feature vectors in which all of the F-term codes are set for elements and 1074-dimensional feature vectors further including the head IPC codes as elements.

From results in FIG. 15, it can be understood that, by using any of the feature vectors, it is possible to perform characteristic classification. This confirms that, even by using the feature vectors containing not only elements corresponding to the F-term codes but also the head IPC codes as elements, it is possible to appropriately classify documents.

EXAMPLE 2

Next, the Japan Platform for Patent Information (J-Plat-Pat) operated by the National Center for Industrial Property Information and Training was used as a document database different from Example 1. All the texts of publications in this document database were searched under searching conditions where the character strings "dish," "oil stain," and "foam cutting" are set with the AND operator. As a result, 35 patent documents were extracted as the to-be-classified document set. There were 345 F-term codes assigned to this to-be-classified document set.

345-dimensional feature vectors were generated with all of the F-term codes assigned to the to-be-classified document set being elements. At this time, in a case where the F-term code was assigned to each document, an element value corresponding to the F-term code was set to be "1," whereas, in a case where the F-term code was not assigned, an element value thereof was set to be "0." Then, k-means clustering was performed using these feature vectors to classify each document in the to-be-classified document set into six clusters. Scikit-learn library package in Python language was used in clustering processing.

Next, 126-dimensional feature vectors were generated, the feature vectors each having, as elements, part (126 codes) of the F-term codes assigned to the same to-be-classified document set. By using these feature vectors, the to-be-classified document set was classified into five clusters through k-means clustering. F-term codes containing the theme code "4H003" were used as the part of all F-term codes. In a case where the F-term codes containing the theme code "4H003" were assigned, an element value corresponding to the F-term codes was set to be "1," whereas, in a case where the F-term codes were not assigned, the element value thereof was set to be "0."

FIG. 16 is a table indicating results of classifying the same to-be-classified document set through the same cluster analysis method with different numbers of clusters using 345-dimensional feature vectors having all F-term codes as elements and 126-dimensional feature vectors having part of all F-term codes as elements.

From results in FIG. 16, it can be understood that, in the matrix concerning results of two cluster analyses, some cells include many documents and other cells do not include many documents. In other words, it can be understood that, by using any of the feature vectors or using cluster analysis with different numbers of clusters, it is possible to perform characteristic classification.

This confirms that it is possible to appropriately classify documents without limiting a document database, without limiting the number of elements of a feature vector, or without limiting the number of clusters for clustering.

Furthermore, latent topic analysis using an LDA method was applied to each of the 345-dimensional feature vectors and the 126-dimensional feature vectors described above. At this time, the number of topics was set to 5. In addition, from among combination rations of latent topics obtained as a result of latent topic analysis, a latent topic indicating the maximum ratio was set as the representative topic of the document. Thus, the 35 documents as to-be-classified document sets were classified into five latent topics. Gensim library package in Python language was used for processing of latent topic analysis through the LDA method. Top ten topic words (F-term codes) that constitute each latent topic through this latent topic analysis were outputted, which resulted in outputting of 35 F-term codes from five latent topics in total.

FIG. 17 indicates tables of results of document classification through latent topic analysis using the LDA method. FIG. 17A is a table indicating results of classification of the same to-be-classified document set through k-means clustering and latent topic analysis (LDA method) using 345-dimensional feature vectors having all of the F-term codes as elements. FIG. 17B is a table indicating results of classification of the same to-be-classified document set through k-means clustering and latent topic analysis (LDA method) using 126-dimensional feature vectors having part of all F-term codes as elements.

From FIG. 17, in the matrices concerning the distribution of numbers of documents for each cluster through k-means clustering and the distribution of numbers of documents for each representative topic through latent topic analysis (LDA method), some cells include many documents, and other cells do not include many documents. Thus, it can be understood that it is possible to perform characteristic classification using any of the analysis methods.

Thus, it is confirmed that, even by using latent topic analysis, it is possible to appropriately classify documents, as with cluster analysis.

EXAMPLE 3

In Example 3, the computer software database (CSDB) of the Japan Platform for Patent Information (J-PlatPat) operated by the National Center for Industrial Property Information and Training was used as a document database. The target documents that were used include manuals, books, domestic technical magazines, non-technical magazines, overseas academic paper, domestic academic paper, company technical journals, journals published by organizations, and collections of abstracts of papers managed in this document database. CS codes, serving as the classification codes based on multi-viewpoint classification, are assigned to each of these target documents.

These target documents were searched under searching conditions where "document," "classification," and "analysis" are set as free-words with the AND operator. As a result, 22 documents (hereinafter, referred to as a group A) were extracted.

In addition, these target documents were searched under searching conditions where "database," "file," "searching," and "similarity degree" are set as free-words with the AND operator. As a result, 23 documents (hereinafter, referred to as a group B) were extracted.

The document sets of the group A and the group B were set as the to-be-classified document sets, and 121 CS term codes were assigned to the to-be-classified document sets in total.

121-dimensional feature vectors were generated with all of CS term codes assigned to the to-be-classified document sets. At this time, in a case where the CS term code was assigned to each document, an element value corresponding to the CS term code was set to be "1," whereas, in a case where the CS term code was not assigned, the element value thereof was set to be "0." Then, k-means clustering was performed using these feature vectors to classify each document in the to-be-classified document sets into six clusters. Scikit-learn library package in Python language was used in clustering processing.

Similarly, k-means clustering was performed using the feature vectors described above to classify each document in the to-be-classified document sets into three clusters.

FIG. 18 indicates tables of results of document classification according to Example 3. FIG. 18A is a table indicating results of classifying into six clusters through k-means clustering using 121-dimensional CS term feature vectors. FIG. 18B is a table indicating results of classifying into three clusters through the same clustering using the same CS term feature vectors as those of FIG. 18A.

From FIG. 18, a certain degree of characteristic can be seen in the distribution of numbers of documents in the group A and the group B for each of the clusters. Thus, it can be understood that, by using feature vectors with CS term, it is possible to perform characteristic classification.

This confirms that, by using another classification code based on multi-viewpoint classification, it is possible to appropriately classify documents, as with F-term cluster analysis and as with F-term for patent documents being used.

The plural flowcharts used in the description above indicate plural processes (processing) in order. However, the order in which these processes are performed in each of the exemplary embodiments is not limited to the order in which they are stated above. In each of the exemplary embodiments, the order of the processes illustrated in the drawings can be changed within a range in which no specific problem occurs.

EXPLANATION OF REFERENCE CHARACTERS 10 document classifying device
11 CPU
12 memory
13 input-output I/F
14 communication unit
15 outputting device
16 inputting device
18 document classifying program
21 searching unit
22 acquiring unit
23 vector generating unit
24 clustering unit
25 generating unit
27 latent topic analyzing unit
29 character-string searching unit

The invention claimed is:

1. A document classifying device comprising:
a document-set acquiring unit that acquires information regarding a to-be-classified document set in which classification codes based on multi-viewpoint classification are assigned to each document in advance;
a vector generating unit that generates a multi-dimensional feature vector for each document in the to-be-classified document set, the multi-dimensional feature vector having, as elements, all or part of the classification codes assigned to the to-be-classified document set;
a classifying unit that performs a plurality of cluster analyses to the to-be-classified document set using the feature vector of each document in the to-be-classified document set; and
a generating unit that generates document classification information indicating results of the plurality of cluster analyses, wherein
the plurality of cluster analyses includes k-means clustering and agglomerative clustering.

2. The document classifying device according to claim 1, wherein
the generating unit generates the document classification information including matrix information concerning a distribution of numbers of documents for each cluster corresponding to a result of the k-means clustering and a distribution of numbers of documents for each cluster corresponding to a result of the agglomerative clustering.

3. The document classifying device according to claim 1, wherein
the generating unit generates the document classification information in which first cluster identifying data and second cluster identifying data are associated with document identifying data for each document in at least part of the to-be-classified document set, the first cluster identifying data being configured to identify each cluster classified through the k-means clustering, the second cluster identifying data being configured to identify each cluster classified through the agglomerative clustering.

4. The document classifying device according to claim 1, further comprising:
a character-string searching unit that searches for a predetermined character string in each document in the to-be-classified document set, wherein
the vector generating unit generates the feature vector further including an element corresponding to a result of searching for the predetermined character string.

5. The document classifying device according to claim 1, wherein
in addition to the classification codes, different-type classification codes based on a different type of classification configured to collectively classify main themes of content of documents are assigned to each document in the to-be-classified document set, and
the vector generating unit generates the feature vector further including, as elements, all or part of the different-type classification codes assigned to the to-be-classified document set.

6. The document classifying device according to claim 1, wherein
the vector generating unit:
generates a first feature vector for each document in the to-be-classified document set, the first feature vector having, as elements, part of the classification codes assigned to the to-be-classified document set; and
further generates a second feature vector for each document in the to-be-classified document set or in part of the to-be-classified document set, the second feature vector having, as elements, at least part of the remaining classification codes,
the classifying unit:
performs one of the plurality of cluster analyses to the to-be-classified document set using the first feature vector; and further performs another of the plurality of cluster analyses to the to-be-classified document set using the second feature vector.

7. The document classifying device according to claim 1, wherein
each of the classification codes has a hierarchical structure and is formed of a partial code in each hierarchical level, and
the vector generating unit generates the feature vector including an element corresponding to a partial code from a highest hierarchical level to a predetermined hierarchical level in each of classification codes in part of the classification codes assigned to the to-be-classified document set.

8. The document classifying device according to claim 1, further comprising:
a searching unit that extracts document information regarding the to-be-classified document set from a document database that stores document information in which the classification codes are assigned to each document, wherein
the document-set acquiring unit acquires the document information regarding the to-be-classified document set extracted by the searching unit.

9. A method for classifying documents, comprising the processes of:
acquiring information regarding a to-be-classified document set in which classification codes based on multi-viewpoint classification are assigned to each document in advance;
generating a multi-dimensional feature vector for each document in the to-be-classified document set, the multi-dimensional feature vector having, as elements, all or part of the classification codes assigned to the to-be-classified document set; and
performing a plurality of cluster analyses to the to-be-classified document set using the feature vector of each document in the to-be-classified document set, wherein
the plurality of cluster analyses includes k-means clustering and agglomerative clustering.

* * * * *